United States Patent
Lundback

(10) Patent No.: US 9,879,648 B2
(45) Date of Patent: Jan. 30, 2018

(54) ENERGY TRANSFORMING UNIT AND ENERGY TRANSFORMING SYSTEM COMPRISING SUCH A UNIT

(71) Applicant: CORPOWER OCEAN AB, Stockholm (SE)

(72) Inventor: Stig Lundback, Vaxholm (SE)

(73) Assignee: CORPOWER OCEAN AB, Stockholm (SE)

( * ) Notice: Subject to any disclaimer, the term of this patent is extended or adjusted under 35 U.S.C. 154(b) by 9 days.

(21) Appl. No.: 15/237,100

(22) Filed: Aug. 15, 2016

(65) Prior Publication Data

US 2016/0348640 A1  Dec. 1, 2016

Related U.S. Application Data

(63) Continuation of application No. 13/810,387, filed as application No. PCT/SE2011/000136 on Jul. 18, 2011, now Pat. No. 9,441,484.

(Continued)

(30) Foreign Application Priority Data

Jul. 16, 2010 (SE) ........................................ 1050811
Dec. 22, 2010 (SE) ........................................ 1051357

(51) Int. Cl.
*F03B 13/18* (2006.01)
*F01C 1/14* (2006.01)
(Continued)

(52) U.S. Cl.
CPC ............ *F03B 13/1845* (2013.01); *F01C 1/14* (2013.01); *F03B 13/187* (2013.01);
(Continued)

(58) Field of Classification Search
CPC .................................... F01C 1/14; Y02E 10/38
(Continued)

(56) References Cited

U.S. PATENT DOCUMENTS 4,118,932 A  10/1978  Sivill
5,176,552 A   1/1993  Kuboyama et al.
(Continued)

FOREIGN PATENT DOCUMENTS

DE          19633590 A1    3/1999
WO          WO03/087570   10/2003
(Continued)

OTHER PUBLICATIONS

Office Action for corresponding EP application 11807140.6 dated Dec. 5, 2016, 5 pages.
(Continued)

*Primary Examiner* — Thomas E Lazo
(74) *Attorney, Agent, or Firm* — Myers Bigel, P.A.

(57) ABSTRACT

The present invention relates to an energy transforming unit adapted to convert reciprocating forces into rotating axle movements on at least one force transmitting axle and/or into electrical power. The unit comprises at least one restriction device which is directly connected to the force and which is arranged to forward the incoming reciprocating forces into a movement over at least one conversion module. The energy transforming unit is characterized in that the at least one restriction device is delimiting one, by the energy transforming unit enclosed reciprocating volume which entirely or partly passes through the at least one conversion module. The reciprocating volume can comprise a non-compressible fluid arranged to forward the incoming forces into a reciprocating fluid movement over the at least one conversion module and/or the reciprocating volume can comprise at least one mechanical force transmitting arrange- (Continued)

ment adapted to the at least one conversion module. The unit further comprises a compact central unit which at least partly encloses the at least one conversion module.

26 Claims, 19 Drawing Sheets

Related U.S. Application Data

(60) Provisional application No. 61/365,015, filed on Jul. 16, 2010.

(51) Int. Cl.
   *F04C 2/18* (2006.01)
   *H02K 35/00* (2006.01)

(52) U.S. Cl.
   CPC .............. *F03B 13/189* (2013.01); *F04C 2/18* (2013.01); *H02K 35/00* (2013.01); *F05B 2260/406* (2013.01); *Y02E 10/38* (2013.01)

(58) Field of Classification Search
   USPC ......................................................... 60/398
   See application file for complete search history.

(56) References Cited

U.S. PATENT DOCUMENTS

| | | | |
|---|---|---|---|
| 5,186,822 A | 2/1993 | Tzong et al. | |
| 6,216,455 B1 | 4/2001 | Doleh et al. | |
| 6,717,284 B2* | 4/2004 | Lin | F03B 13/24 290/42 |
| 6,833,631 B2 | 12/2004 | Van Breems | |
| 7,245,041 B1 | 7/2007 | Olson | |
| 7,632,041 B2 | 12/2009 | Jean | |
| 8,007,252 B2 | 8/2011 | Windle | |
| 2006/0090463 A1 | 5/2006 | Burns | |
| 2006/0202483 A1 | 9/2006 | Gonazalez | |
| 2009/0229902 A1 | 9/2009 | Stansbury, III | |
| 2010/0308589 A1 | 12/2010 | Rohrer | |

FOREIGN PATENT DOCUMENTS

| | | |
|---|---|---|
| WO | WO2009/096796 A2 | 8/2009 |
| WO | WO 2009/152606 | 12/2009 |

OTHER PUBLICATIONS

International Search Report for PCT/SE2011/000136 dated Oct. 11, 2011, 6 pages.
International Preliminary Report on Patentability for PCT/SE2011/000136 dated Nov. 1, 2012, 32 pages.
Office Action for corresponding AU Application No. 2011277145 dated Sep. 7, 2015.

* cited by examiner

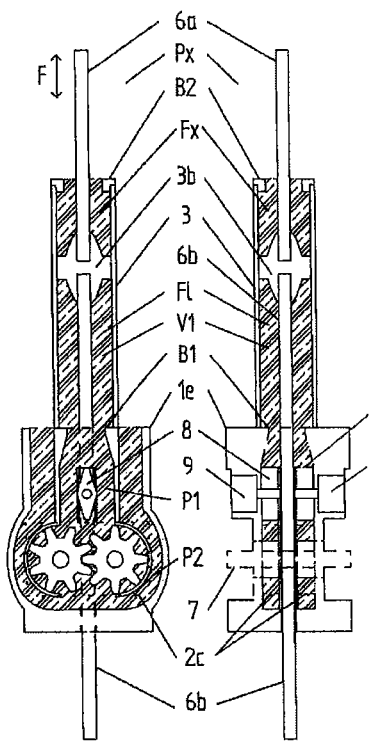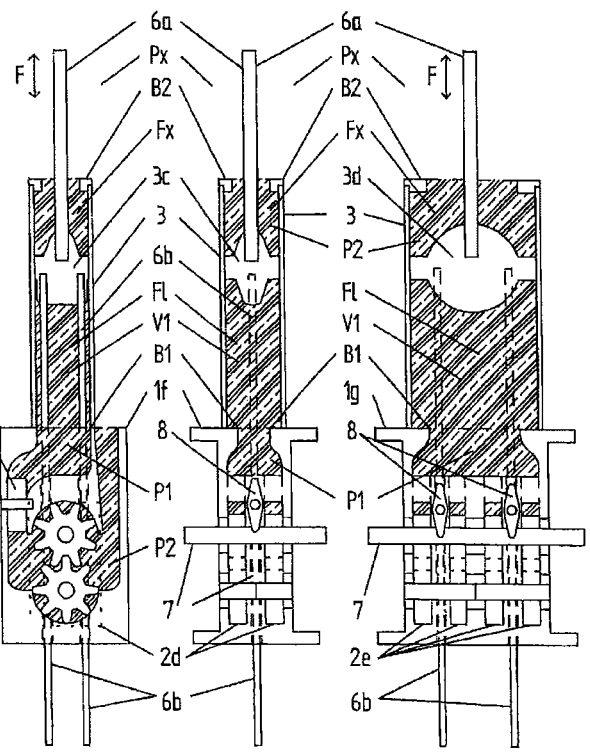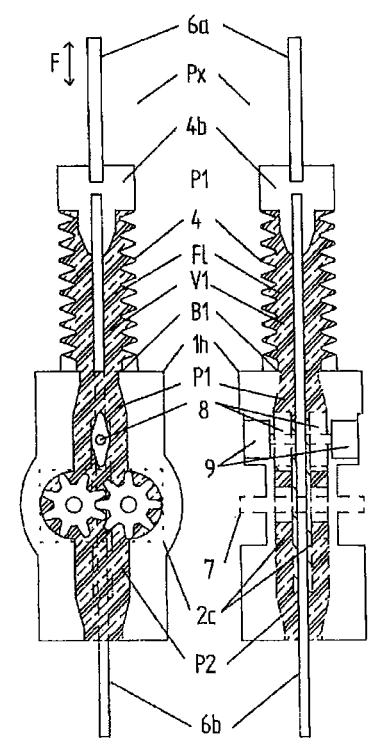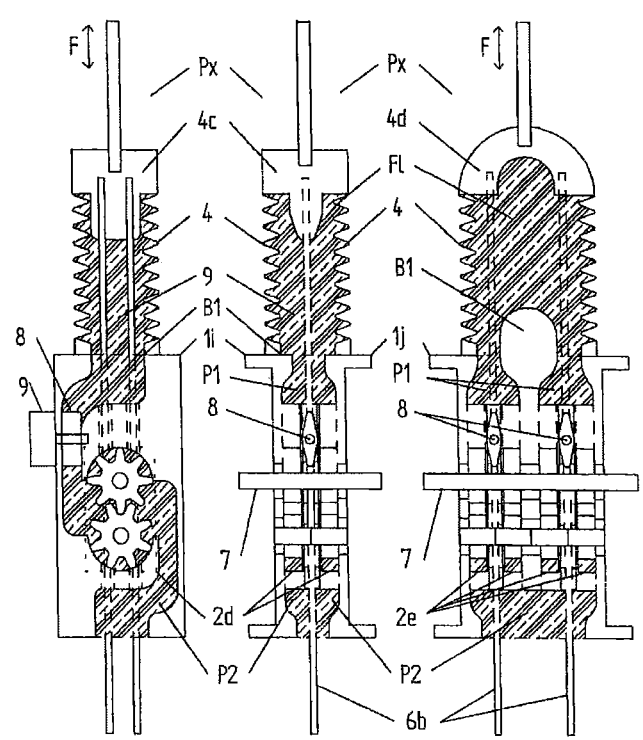
Fig. 2a  Fig. 2b  Fig. 2c  Fig. 2d  Fig. 2e
Fig. 2f  Fig. 2g  Fig. 2h  Fig. 2i  Fig. 2j

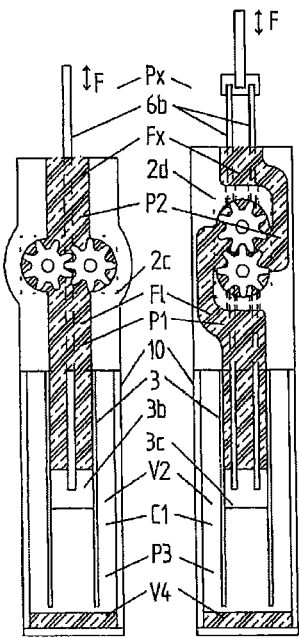
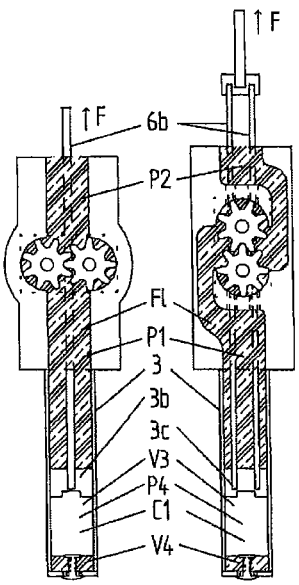
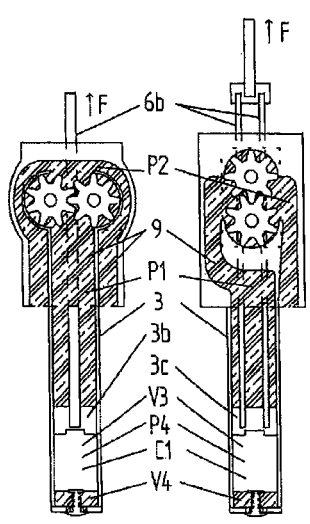
Fig. 3a  Fig. 3b  Fig. 3c  Fig. 3d  Fig. 3e  Fig. 3f
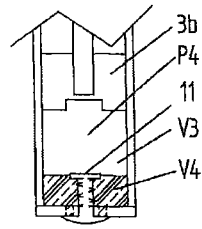
Fig. 3g
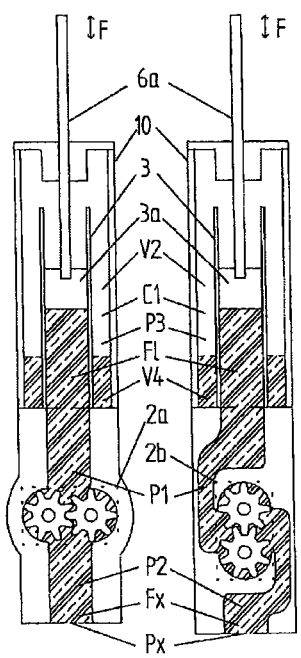
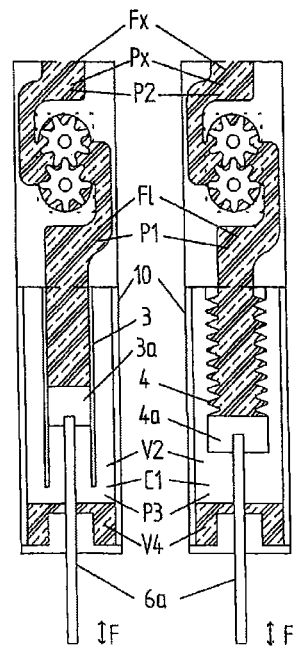
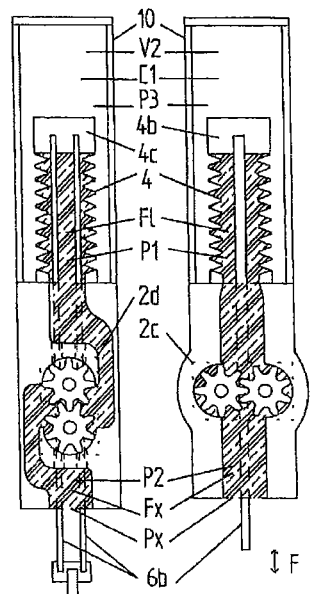
Fig. 3h  Fig. 3i  Fig. 3j  Fig. 3k  Fig. 3l  Fig. 3m

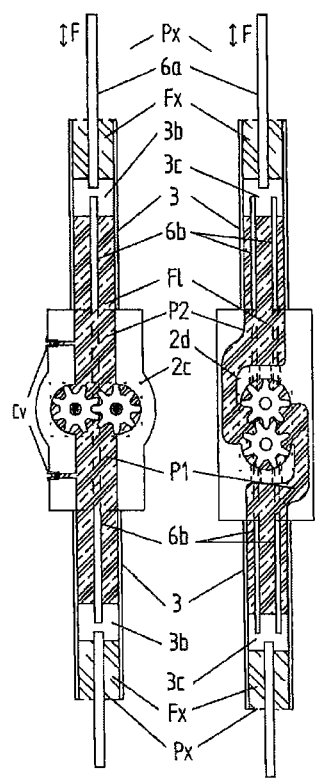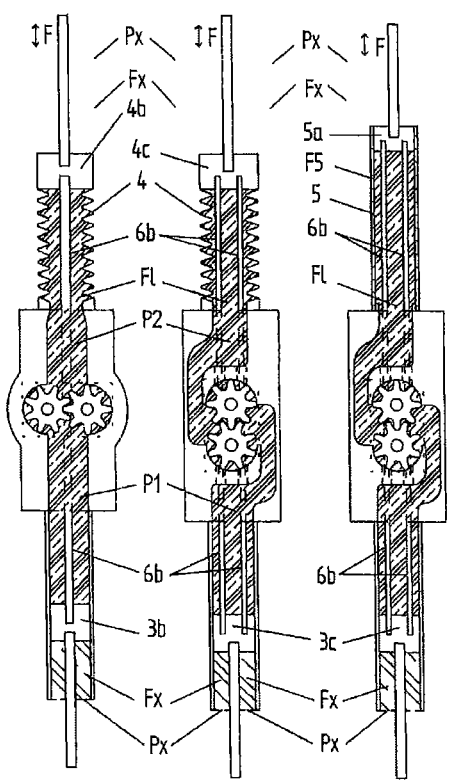
Fig. 4a    Fig. 4b    Fig. 4c    Fig. 4d    Fig. 4e
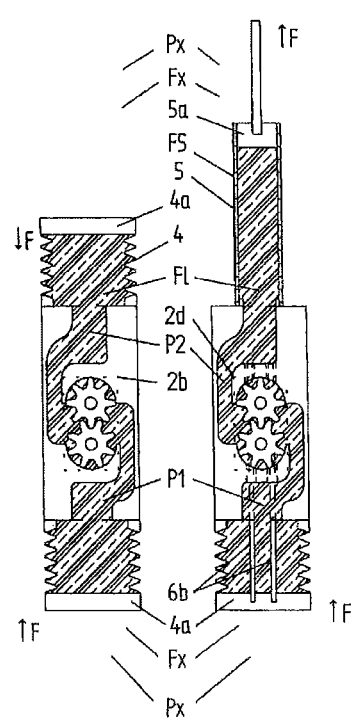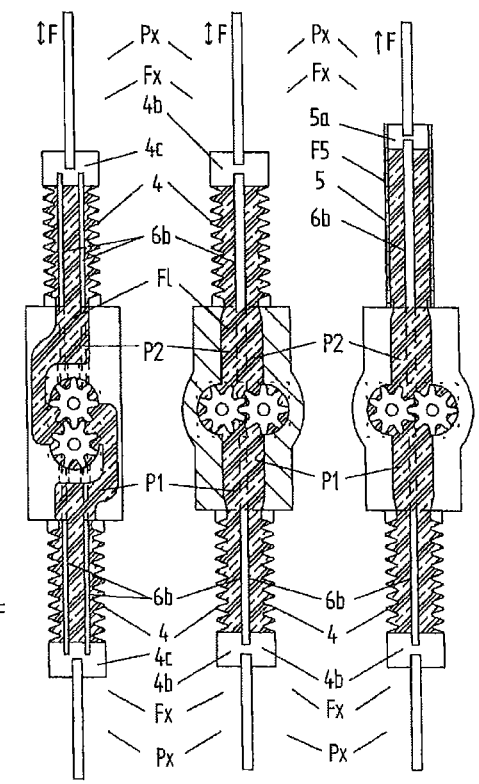
Fig. 5a    Fig. 5b    Fig. 5c    Fig. 5d    Fig. 5e

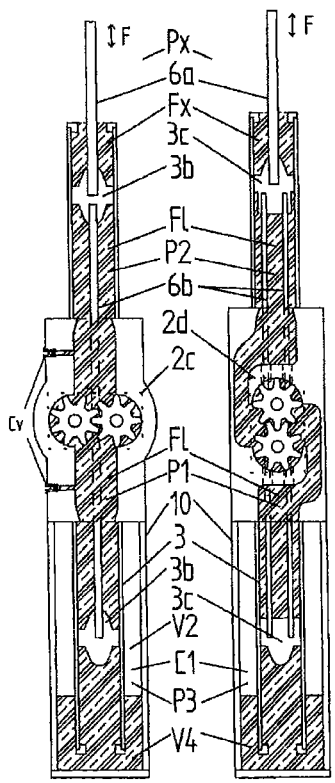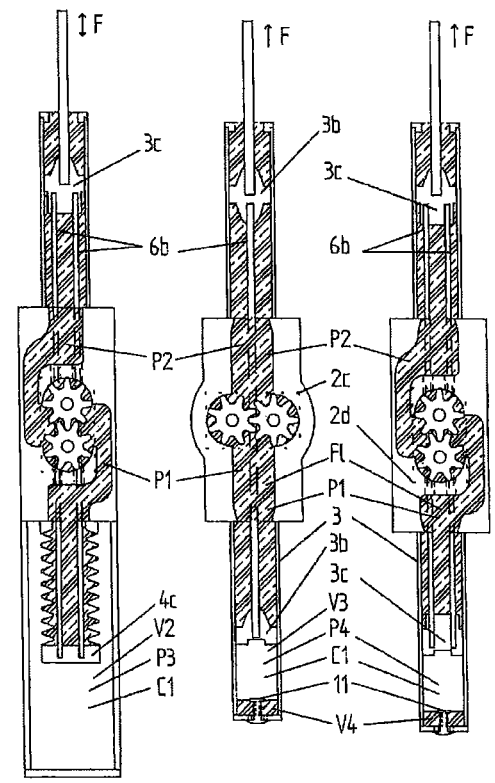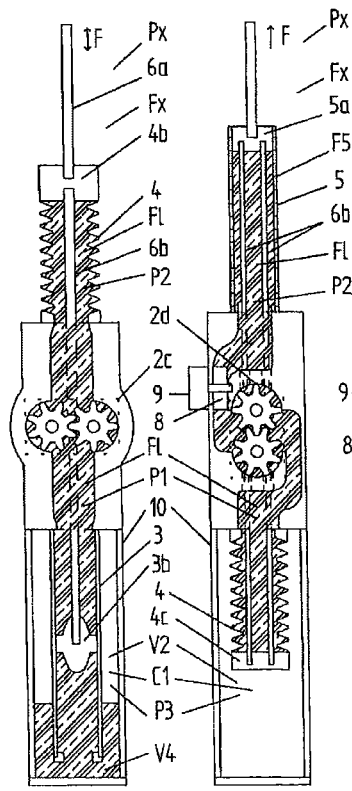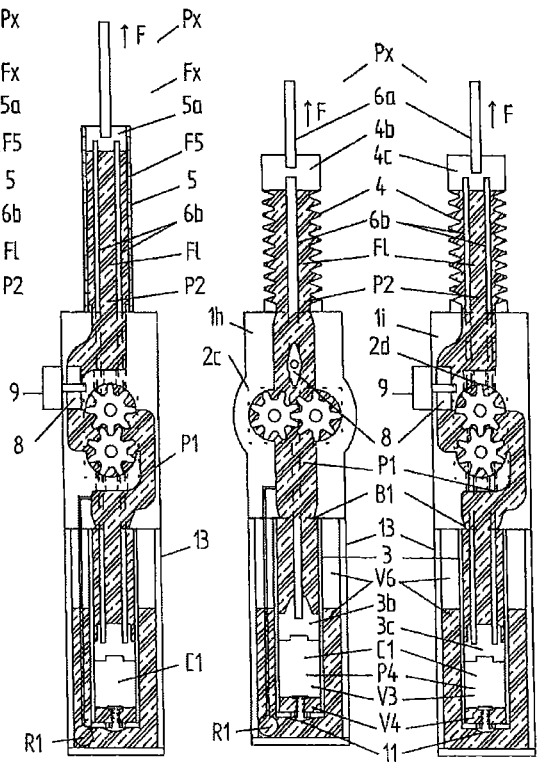
Fig. 6a  Fig. 6b  Fig. 6c  Fig. 6d  Fig. 6e
Fig. 7a  Fig. 7b  Fig. 7c  Fig. 7d  Fig. 7e

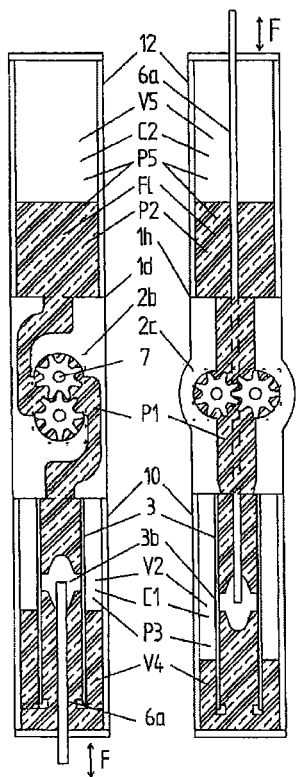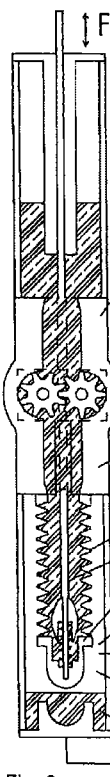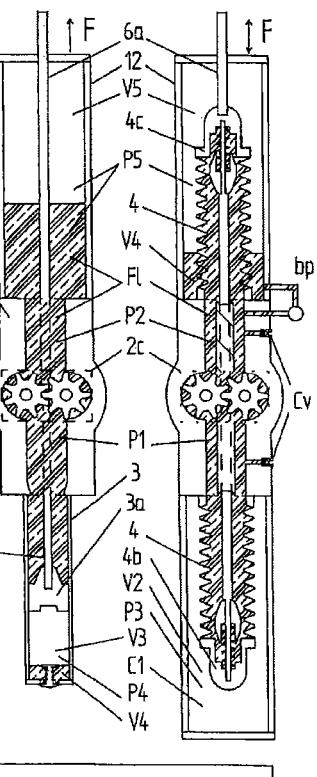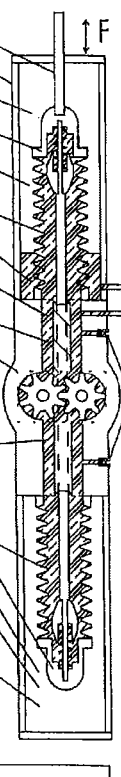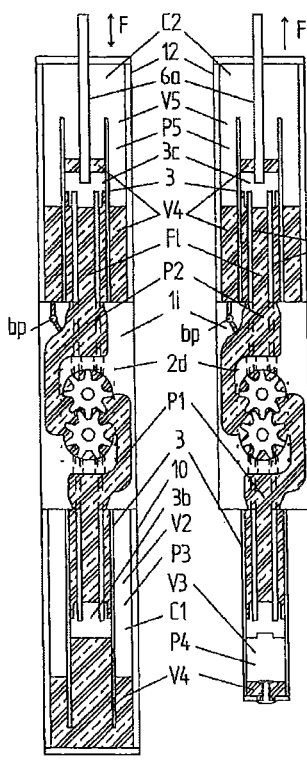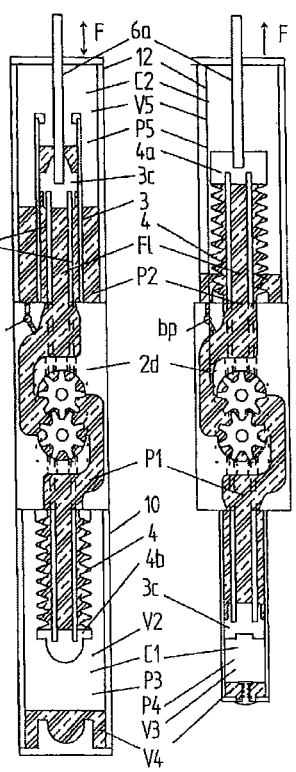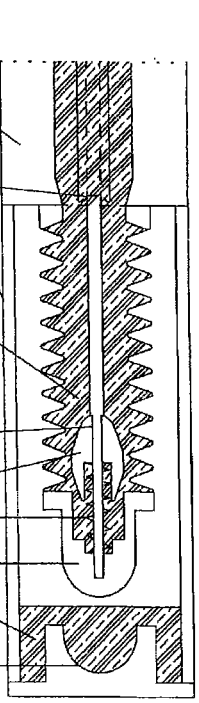

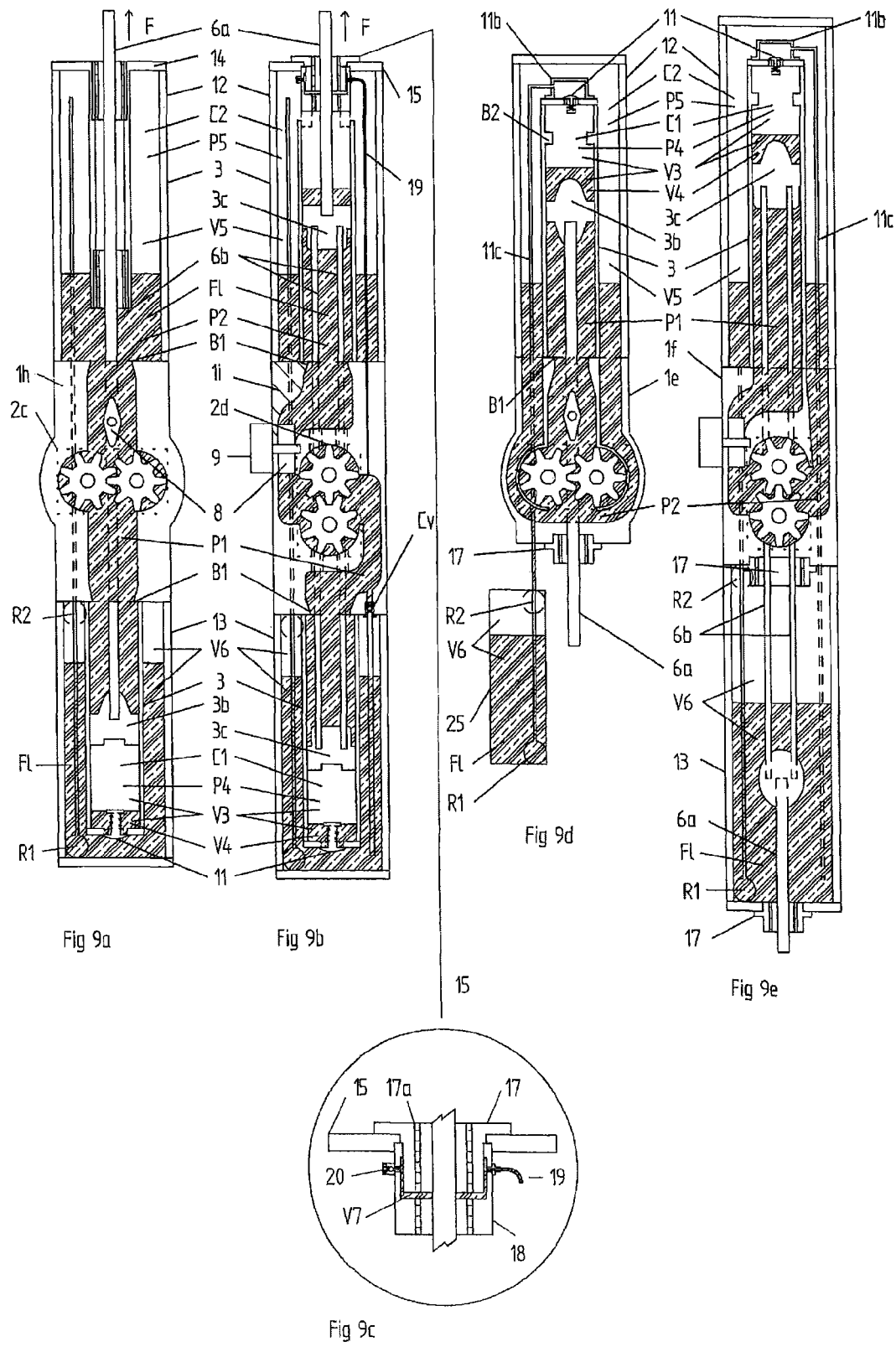

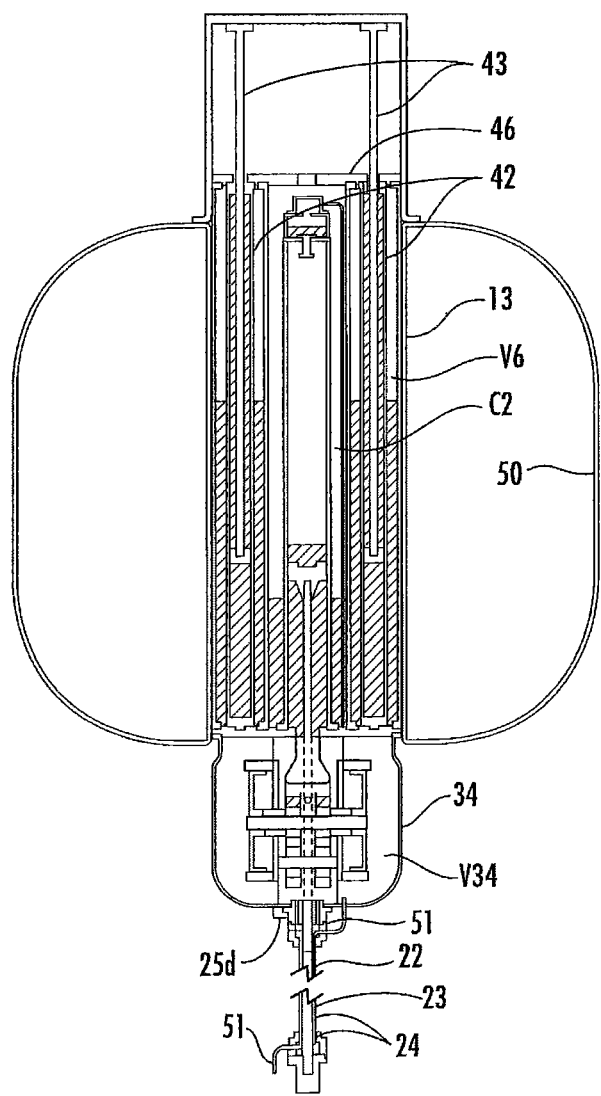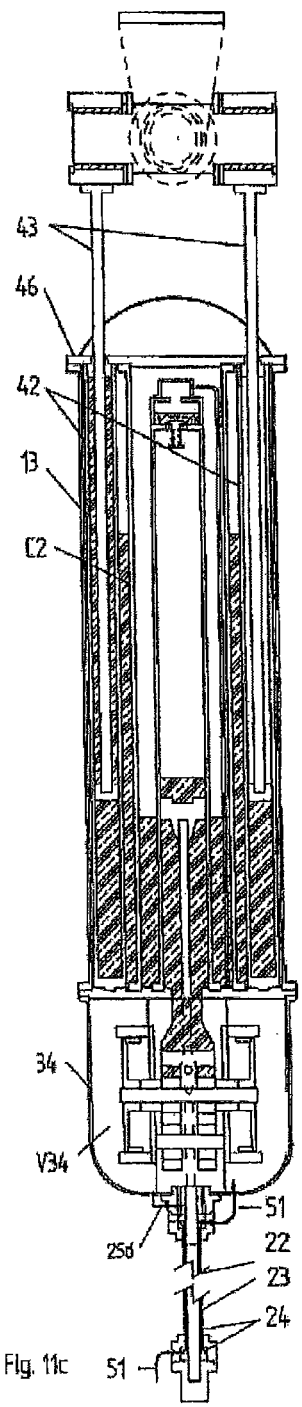

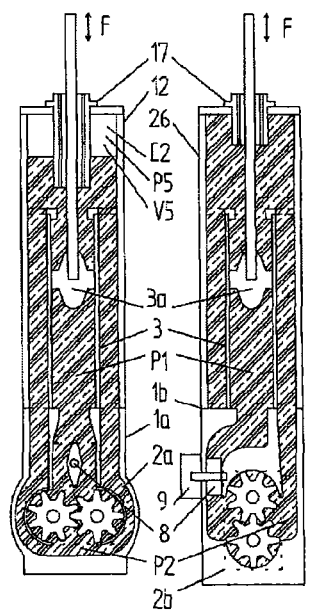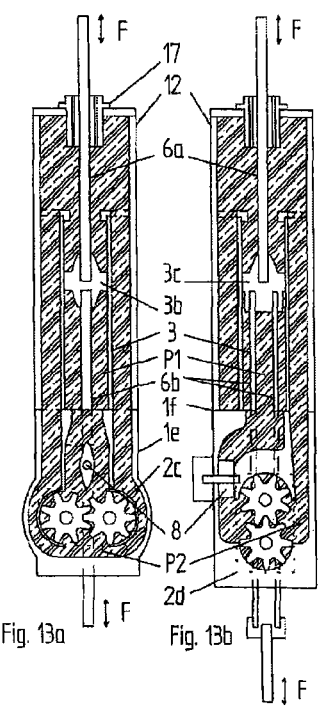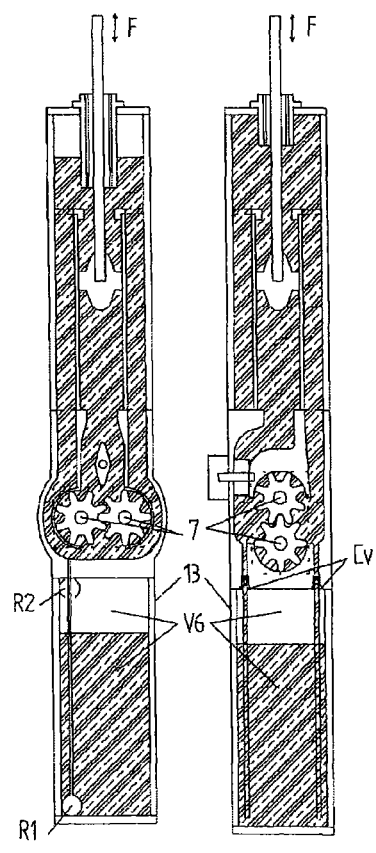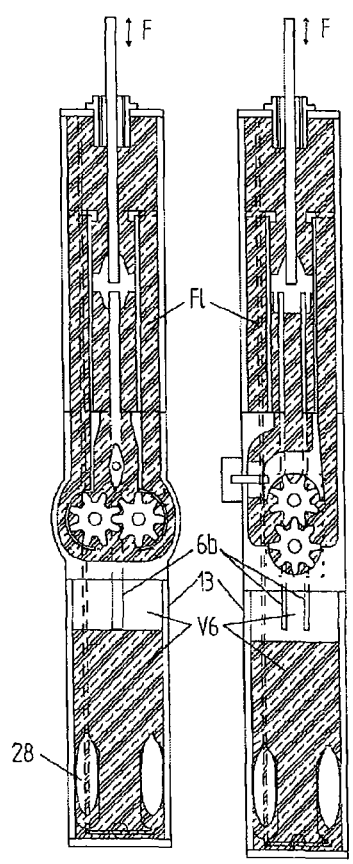
Fig. 12a    Fig. 12b    Fig. 13a    Fig. 13b
Fig. 12c    Fig. 12d    Fig. 13c    Fig. 13d

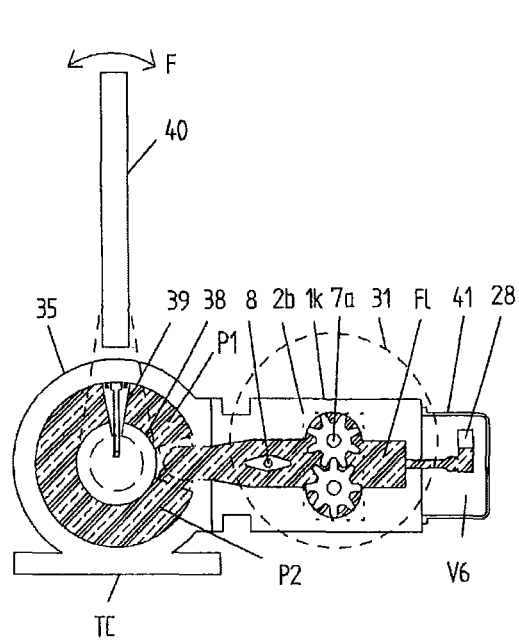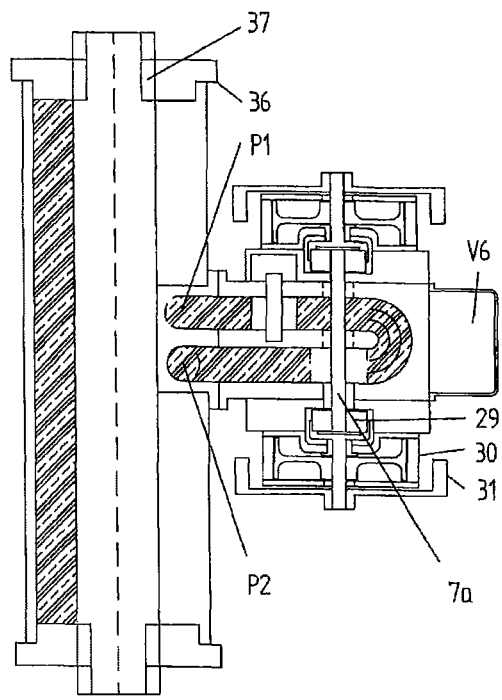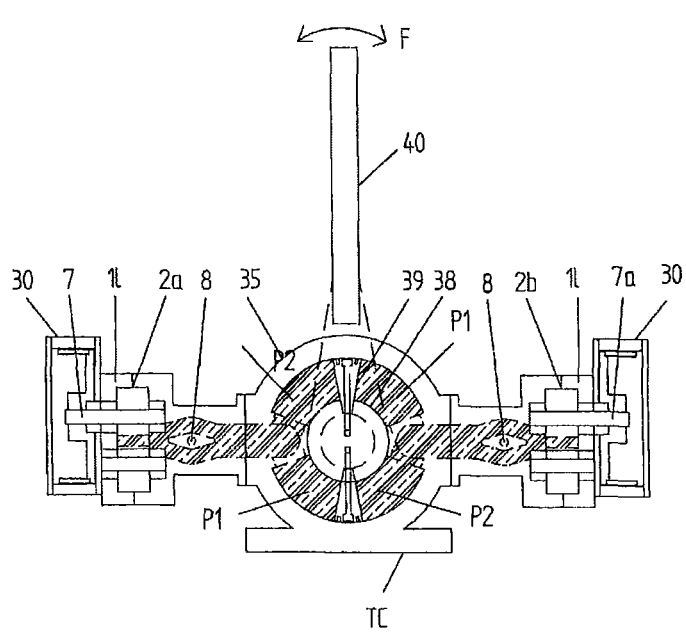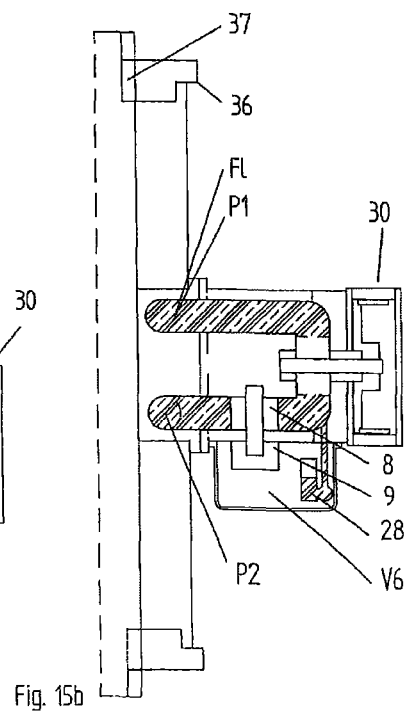
Fig. 14a
Fig. 14b
Fig. 15a
Fig. 15b

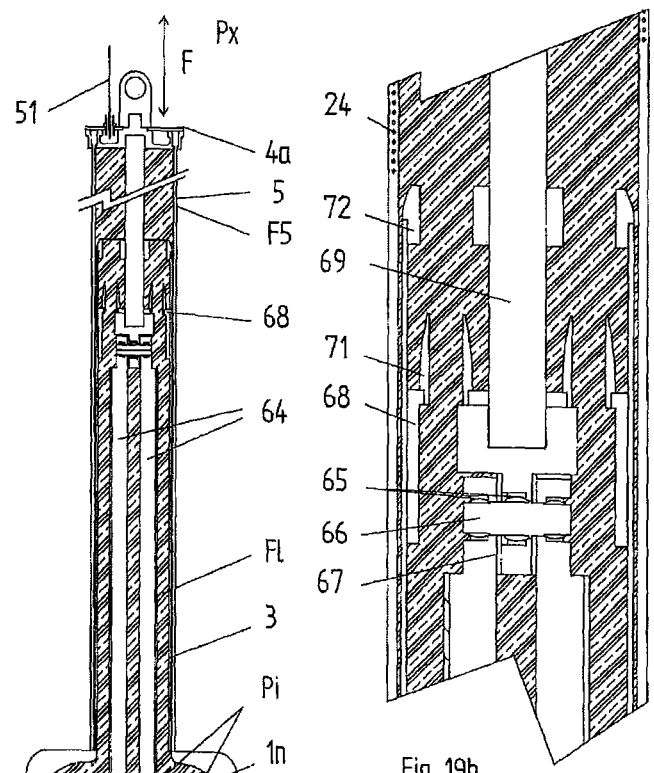
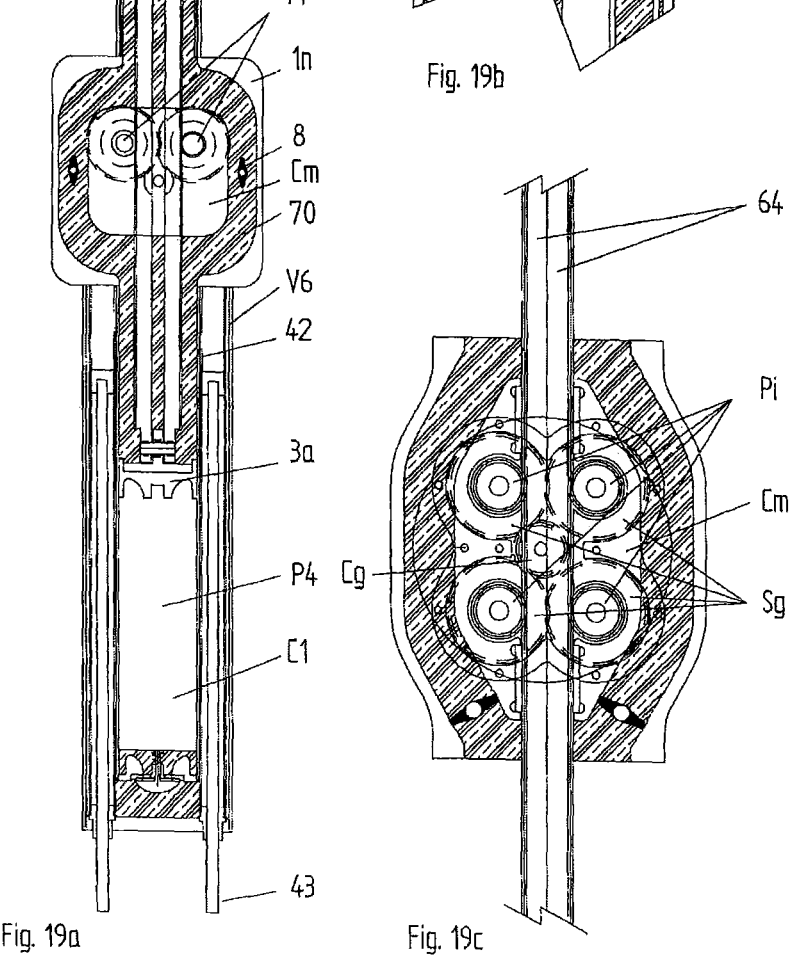
Fig. 19a  Fig. 19b  Fig. 19c

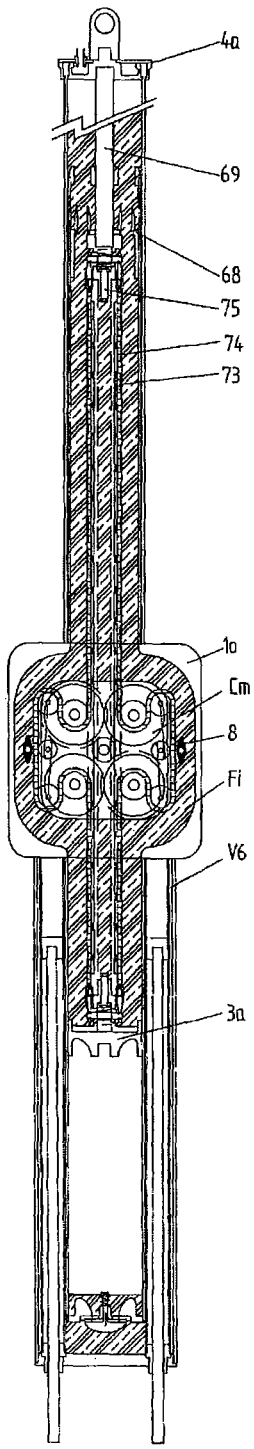
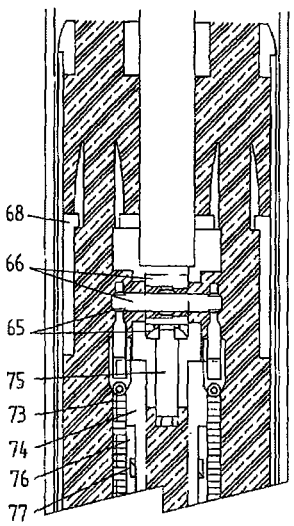
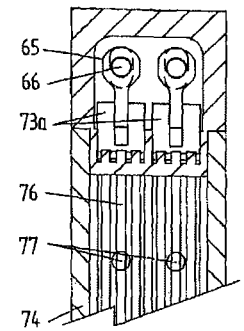
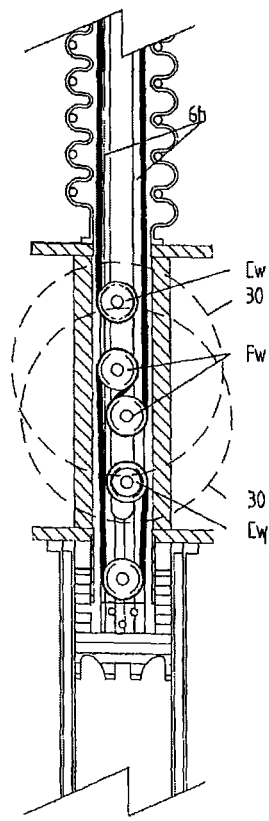
Fig. 20a
Fig. 20b
Fig. 20c
Fig. 20d
Fig. 20e

ENERGY TRANSFORMING UNIT AND ENERGY TRANSFORMING SYSTEM COMPRISING SUCH A UNIT

RELATED APPLICATIONS

The present application is a continuation of U.S. patent application Ser. No. 13/810,387 filed Jan. 15, 2013, which application is a 35 U.S.C. § 371 national phase application of PCT International Application No. PCT/SE2011/000136, filed Jul. 18, 2011, which claims priority from Swedish Patent Application No. 1050811-7, filed Jul. 16, 2010 and Swedish Patent Application 1051357-0 filed Dec. 22, 2010 and U.S. Provisional Patent Application No. 61/365,015; the disclosures of which are hereby incorporated herein by reference in their entirety. PCT International Application No. PCT/SE 2011/000136 is published as PCT Publication No. WO 2012/008896.

TECHNICAL FIELD

The present invention relates generally to an energy transforming unit adapted to convert reciprocating fluid movements into rotating axle movements. The invention also relates to an energy transforming system, for example a wave power plant, comprising such a unit.

BACKGROUND ART

Ocean waves generate both horizontal and vertically rotating oscillating movements, as described in patent application US2007/0158950 and patent application U.S. Pat. No. 7,385,301. The oscillating movements can contain tens and sometimes hundreds of kW per running meter wave and has therefore been subjected to several attempts of creating systems that are able to convert this enormous amount of energy into useful and competitive energy transformers converting the energy into for example electric power. In order to achieve these goals it is not enough to use different types of block diagrams to disclose how a certain energy transformer converts wave movement into for example rotational movements, not without at the same time describe why this certain construction have the requirements for a long lifetime with low supervision and maintenance cost.

The present invention is aiming to create a compact and cost efficient energy transformer unit which functionally and geometrically has been optimized to, by using well-known methods and experiences, be able to calculate life and maintenance costs with regard to material, fluids, gases, and mechanical, electric and electronic components.

The invention has been inspired by the applicants discoveries on the actual pump and automatic control functions of the heart, described in the paper "Cardiac Pumping and Regulating Functions of Intraventricular Septum" (Lundback 1986). In the paper the discovery of a new pump principle was disclosed, now named Dynamic Adaptive Piston pumps (DAP) also disclosed as DeltaV-pumps (ΔV-pumps), see U.S. Pat. No. 4,648,877. These pumps take advantage of the best characteristics of the two earlier known pump principles; the dynamic pump principle (for example centrifugal pumps) and the displacement pump principle (for example piston pumps). The ΔV-pump can during lower flows and frequencies be regarded as a displacement pump where the piston is so designed that it with a one-way directed force, besides a pump work also produces a reciprocating volume, ΔV-volume, which can store and convert energy in order to generate a hydraulic return of the piston, named ΔV-function. The new pump function, which is the same as the real pump function of the heart, has mathematically been described in U.S. Pat. No. 7,239,987.

The nature has both constructed and energized the heart like a ΔV-pump, using the characteristics and functions of the heart muscular cells. These cells perform their work by one-way longitudinal reductions and contractions and need stored energy, ΔV-functions, for their return movement. The one-way power generation of the muscular cells and the hydraulic return of the piston like cardial valve planes of the heart can be compared with the heaving power generation of the waves and has inspired to the present invention; a compact energy transformer.

In order to convert the energy of the ocean waves into mechanical work and/or electric current, energy generating arrangements are required which are able to convey the vertical and/or horizontal forces to the wave movements created by the movements of the water molecules. At larger depth the waves are circular water molecular movements which decreases in intensity the further away from the surface the measurements or energy absorption are performed. At more shallow depth the waves are elliptic water molecular movements. The vertical forces of the waves are in relation to their horizontal forces at lager depth the same, i.e. 50/50%. At smaller depths the vertical forces are more and more added to the horizontal forces, which together with for example the friction to the bottom finally create a break of the wave.

In order to further explain where the present invention can be used as simple and cost effective energy converting units, some examples are below given where historically well-known energy generating arrangements are connected to more or less complex energy transformers of a later date.

In U.S. Pat. No. 1,791,239 (1931, original 1919 OWC, Oscillating Water Column) Braselton describes a way of translating wave energy into electric power by letting the movements of the waves to work as a large piston in a "cylinder"-wave catcher. The movement of the waves translates a large flexible and compressible amount of air towards a converging pipe. In this pipe an air turbine is mounted which transforms the flow of air into electric power. The large and often land based OWC-constructions have a very low efficiency. This is, among other things, due to the difficulty for the air turbines to handle large variations in pressure and flow, which is the result of the reciprocating movement of the air. The Norwegian University of Science and Technology (NTNU) located in Trondheim Norway, did during the 70's and 80's, under the guidance of Budal, perform an extensive study on the OWC-technique by using Point Absorbers (buoys on the ocean surface). In 2003 an abstract was published with conclusions from these studies. In the abstract they revealed that in order to in a cost effective way translate wave energy into electric power, the usage of elastic air as a force translator should be converted into modern hydraulics with latching-controlled buoy movements. Further it was revealed that "small is beautiful", i.e. that the buoy size should not be larger that 5-10% of the wave length, and that the latch technique also was able to protect the whole system during bad weather. Experiments with the OCW-technique are still ongoing, for example by improving the efficiency of the turbines.

U.S. Pat. No. 4,355,511 (1982) describes embodiments where, for example, the latch technique is used.

U.S. Pat. No. 4,172,689 (1979) describes a way where a floating buoy or a craft is arranged so that it collects the waves on one side and converts these towards a water turbine on the opposite side of the craft. This energy absorbing method, plus other methods that utilizes the differences between wave crests and wave troughs on the ocean surface, for example the Pelamis "sea snake", require large constructions to function.

U.S. Pat. No. 4,001,597 (1977) describes how a bottom based energy carrying unit, "wave tilter", on shallow water can be brought to tilt backwards and forwards depending on the horizontal forces of the motion of the waves. The motions of the wave tilters affect water cylinders providing land based turbines with water flow. One example where this technique is used is Aquamarine's sea-wave power technique Oyster Wave Energy Converter, where the "wave tilter" operates water cylinders which under high pressure provide land based pelton-type turbines with water flow. Another example is U.S. Pat. No. 7,131,269 (2006) where the wave tilter via a piston compresses air, taken from above the water, and via an air-lift-pump at the bottom generates a water flow that operates a turbine. Another example is US 2006/0150626 (2006) A1 where a revolving displacement pump with various one way valves are connected to a wave tilter to provide an adjacent hydraulic system with pressurized fluid.

U.S. Pat. No. 3,989,951 (1976) describes how a bottom based energy carrying unit with a flexible rubber membrane catches statistical pressure variations generated by crests of waves and trough of waves at the ocean surface. These pressure variations transfer a gas over a gas turbine producing electric current. This converter should have efficiencies that are comparable with the classical OWC-converter.

U.S. Pat. No. 6,229,225 filed May 1998 and U.S. Pat. No. 6,392,314 filed December 1998 display an embodiment of U.S. Pat. No. 3,989,951 (1976) where a flexible buoy located under the water surface is affected by the wave motions' statistical pressure variations such that compression and decompression of a buoy give displacement changes. This result in variations in pulling forces that can be used to produce mechanical work. The size of the buoys and the migration of the gases through the flexible buoy material may cause long-term problems.

U.S. Pat. No. 4,081,962 (1978) display how a reactive mass under the water surface can be used to create forces opposite to the water motions on the water surface and how these opposite forces can be used to extract energy. Several modifications of this basic concept have been made throughout the years. Wavebob is an example where this technique is being used.

In U.S. Pat. No. 1,318,469 (1919), Wilkinson introduces a simple device where a rope connected to a buoy is used to transform the buoy's motions to mechanical work. Others have with the same basic idea presented solutions which with help from endless wires, belts, chains and gear racks converts the buoy motions to rotating motions of an axis, which can be used for example for the production of electric power. These converting manners give, through its direct connection to the buoy, an efficiency that mostly is determined from the generators efficiency at different number of revolutions. With assistance from the latch-technique that was showed by Budal, however often forgotten or impossible to implement, you can by affecting the buoy's motions in waves optimize the energy absorption from the waves and the efficiency of the converter system.

The life of the seemingly very simple and easily comprehensible constructions is in terms of rope- and wire constructions very short, even during the most optimal conditions. The life for constructions with belts, chains and gear racks can be made considerably longer if they operate under optimal conditions. Another troublesome factor regarding these purely mechanical constructions is to find lasting solutions to protect systems when they reach their closing position. Shock absorbers in the form of steel springs and rubber can be heavy, volume-consuming and create back springing forces that are not always positive.

In U.S. Pat. No. 628,657 (1899) Max Gehre introduces devices which by using buoys and linear generators can generate current from wave movements. This concept has been an object for a number of variants over the years. The problems with these generators are, despite today's magnetic materials, that they in relation to fast rotating generators are bulky, heavy and expensive. These seemingly simple constructions must however be supplemented with an additional latch-technique, shock absorbers and systems to prevent water leakage through the linear passages in connection to the generator room. Furthermore, these systems can't as individual sources of power, be provided with simple devices that levels out energy production.

The most general way to transfer the wave absorbers backward and forward motions to rotary motion is made by means of hydraulics where water or oil operates a turbine or hydraulic engine connected to a generator. The "wave tilter" is ideal for these kind of technique because it is affected by double-acting forces that can be recovered by double-acting pistons or rotating cylinders. On the other hand, point absorbers (buoys) do need some form of energy to perform their accumulated return movements.

The patent application US 2005/0167988 presents an example on how you, by using conventional hydraulic connections, can transform backward and forward motions of a "point absorber" into electric current. This patent application can also serve as background to clarify the differences of the present innovation. The floating buoy in patent application US 2005/0167988 is flexibly connected to a hollow piston rod which hydraulic cylinder via an extension pipe is flexible connected to a hollow piston shaft whose hydraulic cylinder via an elongating pipe is elastically connected to a buoy sinker at the bottom of the sea. Via a piston shaft and a piston the buoy generates a piston displacement which is, by the hollow piston rod, under a high pressure accumulated in a high pressure chamber located in the buoy. This high pressure chamber is, via a controlled variable hydraulic engine and a cooling system, in contact with another pressure chamber with low pressure. The hydraulic engine transforms via a generator the pressure differences within the flow between the both chambers to electric current. The remaining pressure in the low pressure chamber is used to bring back the piston and also the connected buoy to a new starting position in the following trough of the sea. A control system with ventilators and a small pump connected to a reservoir add or remove oil from the system in order to get the pressures in the accumulator tanks to be the right at different times, wave heights, weather situations, etc., so that a continuous flow over the hydraulic motor can be performed during the piston's and the buoy's return movements.

This system is one-way acting i.e. the system utilizes and stores the wave energy during the rising phase of the wave motions to distribute this energy through an arrangement of large accumulator tanks during the whole wave period. The large pressure differences can create problem of gas migration between the accumulator tanks, thus frequent controls must be performed.

SUMMARY OF INVENTION

The present invention comprises in its most maintenance free and long lived embodiments of two fundamental aspects.

According to a first aspect of the invention, an energy transforming unit is provided which is adapted to convert external forces into rotating axle movements on at least one force transmitting axle, wherein the energy transforming unit comprises: a conversion module adapted to convert the external forces into rotating axle movements, at least one restriction device which is arranged to forward the external forces (F) into reciprocating movement over the conversion module, and which is characterized by a central unit which at least partly encloses the conversion module, wherein the reciprocating movement is a reciprocating movement of a fluid within an enclosed volume and/or a reciprocating movement of a mechanical arrangement to forward the external forces into reciprocating movements over the conversion module.

According to a second aspect of the invention, instead of comprising a conversion module adapted to convert energy into rotating axle movements within an enclosed volume, inputting and/or outputting flow channels are provided with one or several latch valves adapted to transform a free reciprocating fluid flow into a closed flow which prevents the movements of the reciprocating volume.

In these embodiments the reciprocating volume, preferably comprising a non-compressible fluid or compressible gas, may be used to convey pressure between the two restriction devices and to contribute as a hydraulic end stop/end position damping. When a non-compressible fluid is used a latch valve function can be added to provide for optimized energy absorption and to contribute to an optimized environment for the mechanics.

The converting module for the fundamental embodiments can be said to be torque convertor and can preferably be constructed according to the principles of continuous displacement pumps such as inwards and outwards facing gear driven pumps, lobrotating and wing pumps, but can alternatively, due to the integrated latch technique at large constructions, comprise turbine wheels, if also one or more latch valves are provided. All components in the energy transformer operate under such conditions that feasible dimensions with associated life and maintenance intervals can be calculated.

The fundamental embodiments generate forces opposite directed to the towards the energy converter incoming forces, partly by energy conversion and partly by the creation of pressure gradients over at least one, for example the primary, of the opposite restriction devices, which can convert stored energy into returning pulling and/or pushing forces and contribute to a continued energy conversion.

An important factor for a long life is, among other things, to prevent cavitation. Due to this, the fluid in the energy converter should not be in direct contact with possible volumes of gas in the same. This is prevented by delimiting the reciprocating fluid between two restriction devices, preferably, but not necessarily, of the same size, where for example the secondary restriction device directly or indirectly by a piston conveys the pressures from an external or internal compliance chamber to the opposite restriction device. If the restriction devices are constructed having different sizes, a smaller bypass flow can be created, which for example through an oil filter can be conducted directly to a possible compliance chamber. Further, embodiments with hydraulic conversion modules have been constructed and dimensioned to so that the pressure fall across the conversion modules does not need to be reduced more than approximately 1-4 times in order to obtain nominal effects.

The reciprocating fluid has no cavitation problem when the embodiments are equipped with mechanical conversion modules. These can be gear racks, chains, thin steel bands, timing belts, steel wires or synthetic cords.

The embodiments of the invention must be chosen or adapted to that they receive optimized functions in relation to the earth acceleration. This due to that the energy transformer, in some cases, operates in an integrated connection between liquid and gas, whose levels are dependent on the orientation of the energy transformer in relation to the earth acceleration.

The energy transformer can in several embodiments be modified to extract energy from, for example, the wave translating arrangements as previously disclosed but it can also be used to extract energy from other reciprocating movements, for example created by wind and water flow. Pulling force transmission into the energy transformer is in most cases the most promising solution. Manufacturing and installation costs, maintenance costs and life are determinant factors when deciding which embodiment is most suitable for the intended energy transformer.

Thus, the present invention relates to an energy transforming unit adapted to convert reciprocating forces into rotating axle movements on at least one force transmitting axle and/or into electrical power. The unit comprises at least one restriction device which is directly connected to the force and which is arranged to forward the incoming forces into a volume translating movement over at least one conversion module. The energy transformer is characterized in that the at least one restriction device is delimiting one, by the energy transforming unit enclosed reciprocating volume which entirely or partly passes through the at least one conversion module. The reciprocating volume can comprise a fluid of non-compressible fluid or gas arranged to forward the incoming forces into reciprocating movements over the at least one conversion module and/or the reciprocating volume can comprise at least one mechanical force transmitting arrangement adapted to the at least one conversion module. The unit further comprises a compact central unit which at least partly encloses the at least one conversion module.

The reciprocating volume delimited by the restriction device and the energy transforming unit is by the reciprocating forces put into a reciprocating movement over the power generating conversion module. These movements can be converted by the conversion module into useable energy/electricity by a power transmitting axle or a generator. The reciprocating volume can be said to be a non-compressible fluid or a mechanical force transmitting arrangement such as a piston/piston shaft, a gear rack, timing belt, a chain or other similar arrangements taking up a certain volume which passes over or through the conversion module. When the reciprocating volume comprises a mechanical arrangement the conversion module is adapted to the arrangement, for example if the arrangement is a gear rack the conversion module comprises corresponding gears.

According to one embodiment of the invention the at least one restriction device is in direct or indirect connection with at least one yielding compliance chamber to enable reciprocating volumes and absorption of energy.

In another embodiment is the at least one compliance chamber is delimited from its surroundings.

The at least one compliance chamber can be an external (open to the surroundings) or internal (delimited from the surroundings) chamber which is filled with a compressible medium, such as for example gas. The pressure gradient which is created between the restriction device and the compliance chamber can be stored as energy by compression or decompression of the compressible medium. The stored energy can be transferred to the restriction device by using pushing or pulling devices which does not put a load on the conversion module. It is also possible that the restriction device is connected to two compliance chambers, for example one internal and one external compliance chamber, where the external chamber can be the outer surroundings and the internal compliance chamber can be delimited from the surroundings and be placed internally in the energy transforming unit. It is also possible that the restriction device is in connection with two from the surroundings delimited compliance chambers to make it possible with internally reciprocating volumes with double energy storage. When the restriction devices are in direct connection with the compliance chamber the pressure gradient over the restriction device can be created directly by the reciprocating force acting on the reciprocating volume. The reciprocating volume can in this case be a mechanical force transmitting device. When the restriction device is in indirect connection with the compliance chamber the reciprocating volume can be a non compressible fluid.

In another embodiment the at least one compliance chamber is provided with an underpressure and is connected to the surroundings by a one way valve.

If the incoming external forces are connected to a double acting restriction device (preferably when the restriction device is a piston or a rotating wing) a large under pressure (vacuum) can arise in the compressible medium located in the compliance chamber, usually on one side of the restriction device. The incoming forces are then possible to convert into pulling forces over the conversion modules. By providing the underpressure volume created by the double acting restriction device with a valve which can be opened by the return motions of the restriction device, leakage of fluid, for example over piston seals, can be drained and a maximum sized underpressure volume can be maintained.

In one embodiment the delimited reciprocating volume is a fluid and limited by any of the following; restriction device and conversion module, two from each other separated restriction devices, restriction device and at least one compliance chamber.

By limiting the reciprocating fluid volume an oscillating displacement volume is created which can be used for energy extraction. The reciprocating fluid volume is either acting directly or indirectly against a compliance volume or either is an external or internal closed fluid circuit created. If the fluid volume is limited by at least one restriction device interacting with at least one compressible compliance chamber, energy can be stored in the compliance chamber.

In one embodiment the least one restriction device is connected to at least one force transmitting device so that the incoming external forces are stored in the at least one compliance chamber, parallel to a transformation of the forces into mechanical and/or electrical power in the central units.

The force transmitting device can be a non compressible fluid and or a mechanical unit such as a piston shaft or similar. The parallel storage of the forces makes it possible to translate the stored energy into pulling return forces. Thus the energy transformation is continued even if no external force is acting on the unit.

In one embodiment the energy transforming unit comprises two opposite restriction devices, which do not necessarily have to be of the same size, arranged on each side of the central unit. The opposite restriction devices can for example be one lower primary restriction device and one upper secondary restriction device. These restriction devices delimits the reciprocating volume over the at least one conversion module from the at least one compliance chamber.

The opposite restriction devices can also be mechanically connected. If so, their motions are uniform and connected. The, by the restriction devices enclosed, fluid volume can easily be separated from an internal gas volume and if the secondary restriction device is a piston, this piston also functions as an excellent guidance means for the incoming piston shaft. In embodiments where only one restriction device, for example the primary restriction device, is connected to the external incoming forces, the secondary restriction device is in principle an outer and/or inner compliance chamber, the internal pressure of which is transmitted to the primary restriction device by the external and/or internal fluid.

In another embodiment at least one restriction device is mechanically connected to the incoming external forces, thus generating two volume transmitting movements which creates an external or internal closed cycle over said at least one conversion module by movements of a fluid.

If you do not wish an energy storage in compressible compliance chambers, the restriction devices can be connected entirely mechanically (for example like the two sides of a rotating arm in a wave tilter) or mechanically but with a fluid in between the restriction devices. This creates an external or internal fluid circuit which leads to reciprocating fluid volume movements over the central unit and its conversion module.

In one embodiment of the invention the central unit comprises in and out putting flow channels which lead to and from said at least one conversion module in which the reciprocating fluid is arranged to be guided.

Thus the central unit is a compact unit that can be described as a volume enclosing and providing at least one conversion module with in and out putting flow channels which are adapted to guide a fluid flow created by an external force acting on at least one restriction device.

In another embodiment the inputting and/or outputting flow channels can be provided with one or several latch valves/shut-off valves adapted to transform a free reciprocating fluid flow into a closed flow which prevents the movements of the reciprocating volume.

The reciprocating volumes in the in and out putting flow channels comprise a fluid having a pressure conveying role between the primary and the secondary restriction device. Preferably is the fluid flow over the conversion modules controlled by a control- and communication module which by opening and closing of the latch valves/shut-off valves controls and optimizes the force absorption and movements to fit the strokes the energy transforming units are built for. The control- and communication module is adapted to automatically supervise and optimize the functions of the energy transformer by using internal sensors and controllable mechanics.

In another embodiment is at least one restriction device connected to a service volume which is delimited from the surroundings.

The service volume may contain fluid such as gas, liquid and other components to be included in a system optimizing the internal volume for the mechanics and the functions of the energy transforming unit. The service volume may also prevent emergence of cavitation and in the same time provide enough fluid for creating a hydraulic deceleration and end stop/end position damping of the restriction device. The volume in the service volume is preferably pressurized by a certain pressure.

In another embodiment, the unit further comprises a braking arrangement which is a mechanic or hydraulic brake adapted to decelerate the transmitted fluid movements in the end position/positions of the energy transforming units.

The braking arrangement can be designed so that valves, cylinder top and piston shapes create a hydraulic end stop/end position damping for the restriction device or the restriction device itself can be designed to create a hydraulic end stop/end position damping against the central unit. In order to protect the central units from unnecessary forces, the braking arrangements are so arranged that the forces they generate are separated from the forces acting on the conversion modules and the fluid surrounding these.

In another embodiment, the conversion module comprises at least some of the following; displacement pump, gear rack, chain, cord, timing belt, steel or synthetic band, wire, rope or magnetic force transmitters.

For example the reciprocating fluid movements can operate two or several conversion modules, for example two lobrotating pumps to increase the energy density of the converter and increase the possibility of creating a symmetric design. Reciprocating mechanical movements can be transmitted by one or several gear racks, chains, timing belts, steel or synthetic bands, wires, ropes or profiles for permanent magnets. If gear racks are used they are preferably arranged in pair having two respective and connected pinions to increase the energy density of the converter and to increase the possibility of creating a symmetric power output. The gear racks create a stabile adapted connection between the pistons of the two opposite restriction devices which leads to an even force distribution on the gear racks. If two or more chains are used, the energy density of the converter may increase and also the possibility of creating a symmetric design. The chains can be flexibly connected to the restrictions devices/pistons and can be hold in place by permanent magnets towards the bars which mechanically and rigidly connects and transmits the incoming external forces to the two opposite restriction devices. Chains stretch and get longer during their life time. Thus, it is also possible that the chains are connected to chain stretching loops or wheels in order to constantly absorb the prolongation of the chains. If two or more timing belts are used they are preferably mounted in pre-stretched spring like connections to the two opposite and rigidly connected restriction devices. The spring like connections will adjust the pre-stretched forces to the actual forces that the timing-belts are transforming to the conversion modules. That will prolong the lifetime of the timing belts. If two or more thin steel bands, steel wires or synthetic ropes are used the reciprocating movements are transformed into rotating axle movements by up- and unwinding on two or more drums in an upper and lower arrangement. The steel bands for each drum may comprise two thin laminas to receive optimized life and strength in relation to the diameter of the drum and the transmitted forces. Each lamina of the steel bands have attachment devices to the mechanically rigidly connected opposite restriction devices. The attachment devices provide an even force distribution of the laminas, compensate for a longer running of one lamina, strains the steel band when they are winded and compensate for the total difference in length resulting from the winding and unwinding between the upper and lower arrangements and the rigidly connected restriction devices. Each wire or rope has attachment devices to the mechanically rigidly connected opposite restriction devices. The attachment devices provide an even force distribution to the wires or ropes, strains the wires or ropes when they are winded on the drums and during rotation of the drums they are following spirally shaped recesses in the drums to prevent unnecessary wear. If profiles comprising permanent magnets are used a magnetic force distribution is created by using permanent magnets arranged in the mechanical connections connecting the opposite restriction devices. Coils arranged in the central unit may create one or several linear generators directly converting the reciprocating movements into electrical current.

Preferably the conversion modules are placed so that the rotating axles and their attached energy transforming units create a combined energy transformer with a good symmetry and weight distribution. The conversion module can also be placed so that their rotating axles can be joined into one centrally placed rotation axle with a double or one-way rotation direction. The rotating axle can operate one or two opposite generators with or without flywheel or high pressure pumps for generating electrical power or for fresh water production.

In another embodiment the at least one restriction device comprises at least one of the following: a double acting restriction device having the shape of a straight cylinder with a piston or a cylinder with a revolving piston element, or one way acting restriction devices such as an enclosed bellows, back springing straight or spiral shaped elastomeric cylinders.

If the secondary restriction device is created by a cylinder with a non sealing piston it can, in addition to its connection to the piston of the primary restriction device, also have a connection to an outer hermetically sealed elastic elastomeric cylinder or bellow. With this construction the external reciprocating forces can be transferred to the converter without using linear lead-throughs, such as for example a piston shaft. The elastomeric cylinders also create internal enclosed circles without energy storage which can be used for hydraulic torque conversion or as double internally arranged energy storage volumes. Torque balanced spiral shaped elastomeric cylinders can also be used. A torque balanced cylinder is a cylinder which is split into two similar sized parts where one part is turned to the right and the other part is turned to the left, i.e. 50% right turned and 50% left turned with a joint in the middle. The non sealing piston in the secondary restriction device can be provided with conically shaped pipes which partly lets fluid through to match the volume changes created by the additional area of the elastomeric cylinder or bellow which in turn is matched by the piston area of the primary restriction device and partly creates an hydraulic end stop which fits suitable recesses in the cylinder top.

In another embodiment one or several hydraulic cylinders are located in the service volume. These hydraulic cylinders are adapted to position the energy transforming unit in a certain position to optimize force absorption and to use the stroke of the energy transforming unit in an optimized way.

In yet another embodiment the energy transforming unit, together with integrated equipment, is entirely or partly enclosed by a closed volume. The closed volume can be pressurized with an inert gas to prevent oxidation and to give the transforming unit a desired density.

The invention also relates to an energy transforming unit adapted to convert reciprocating external forces into rotating axle movements on at least one force transmitting axle ejecting from at least one conversion module. The unit comprises a central unit comprising the conversion module and its at least one force transmitting axle and also in- and outflow channels which leads an enclosed reciprocating volume comprising a fluid to and from said at least one conversion module. The reciprocating volume is delimited by the unit and by at least one primary and one secondary restriction device, wherein the primary restriction device can have the shape of a bellow or an elastic straight or spiral shaped elastomeric cylinder with an hermitically closed top or have the shape of a piston, the extending piston shaft of which is enclosed by a bellow or an elastic straight or spiral shaped elastomeric cylinder with an hermetically closed top. The hermetically closed top is adapted to be applied by the external force. The secondary opposite restriction device have the shape of a cylinder comprising a reciprocating piston, wherein the reciprocating piston delimits an internal compliance chamber from the enclosed reciprocating volume delimited by the restriction devices. Further, the unit comprises one or several mechanical force transmitting devices which connects the closed top with the reciprocating piston, locks them in relation to each other and transmits the external force between each restriction device. Whereby energy is stored in the compliance chamber by compression or decompression of the chamber so that the enclosed reciprocating fluid volume, without being affected by the external force, follows the reciprocating movements of the restriction devices and the stored energy is converted in the conversion modules.

Through this design energy is stored in the compliance chamber by compression or decompression of the chamber so that the fluid arranged between the restriction devices can, without being affected by the external force, follow the reciprocating movements of the restriction device. Thus, the stored energy can be transformed into a useable rotation movement by moving the enclosed fluid volume over the conversion modules.

The invention also relates to an energy transforming unit adapted to convert reciprocating external forces into directly produced electric power using one or several linear generators. In this embodiment the unit comprises a central unit comprising at least one coil for direct production of electric power and in and out putting flow channels which lead an enclosed reciprocating volume comprising a fluid to pass over said at least one coil. The reciprocating volume is delimited by the unit and at least one primary and one secondary restriction device, wherein the primary restriction device can have the shape of a bellow or an elastic straight or spiral shaped elastomeric cylinder with an hermitically closed top or have the shape of a piston, the extending piston shaft of which is enclosed by a bellow or an elastic straight or spiral shaped elastomeric cylinder with an hermetically closed top. The hermetically closed top is adapted to be applied by the external force. The secondary opposite restriction device have the shape of a cylinder comprising a reciprocating piston, wherein the reciprocating piston delimits an internal compliance chamber from the enclosed reciprocating volume delimited by the restriction devices. The unit further comprises one or several mechanical force transmitting devices comprising permanent magnets for direct production of electric power. The force transmitting devices connects the closed top with the reciprocating piston, locks them in relation to each other and transmits the external force between each restriction device, whereby energy is stored in the compliance chamber by compression or decompression of the chamber.

This embodiment makes it possible to directly produce power using a generator without having to use a conversion module. When the external force acts on a restriction device in the shape of a bellow or an elastic straight or spiral shaped elastomeric cylinder with a hermetically sealed top, it is possible to use the energy in the reciprocating movements without using a piston shaft with a necessary piston shaft seal which is difficult to dimension. Thus, the inside volume of the unit can be hermetically sealed and problems with leakage of internal fluid and/or suction of external fluid can be avoided.

In one embodiment the energy transforming unit further comprises a hydraulic braking arrangement which is adapted to protect the central unit and its conversion modules or linear generators from damaging pressure peaks. The in the central unit arranged in and/or out putting flow channels can also be provided with one or more latch valves adapted to transform a free reciprocating fluid flow into a closed flow which prevents the movements of the reciprocating volume. Thereby the energy extraction from for example the wave movements can be optimized and the reciprocating movements can in an effective way be transformed into movements providing an effective translation into mechanical work and the production of for example electric power.

In another embodiment of the invention, the straight and spiral shaped elastomeric cylinders of the energy transforming unit are provided with conducting threads or wires for current feed and communication.

The invention also relates to an energy transforming system characterized in that an energy transforming unit according to any of the above embodiments have been integrated in or is in closed contact with an energy absorber having the shape of any of the following: a point absorber with an opposite force created by a reactive mass or a weight at the bottom of a sea or an ocean, a wave tilter anchored at a suitable depth at the bottom of a sea or an ocean, close to the seashore to catch the breaking waves or an energy transforming unit adapted to convert reciprocating wind or water currents.

The energy transforming unit according to the above can be flexibly mounted in a sinker or between a sinker on a sea or lake bottom and a point absorber. The point absorber can be a compressible buoy adapted to be affected of the water pressure under a water surface or alternatively a buoy adapted to float on a water surface. The point absorber can also be a wave tilter anchored at a suitable depth at the bottom of an ocean or a lake. The energy transforming unit can also be mounted between an anchoring point and energy absorbing units for wind or water currents or be mounted between two anchoring points as a flexible energy producing link used in parallel with a retaining mooring cable or an anchoring line. The energy transforming unit can also be connected to a foundation comprising a cylinder with a double acting rotatable piston element connected to a rotatable torque converting part. The torque converting part may be a lever or a plate which is able to transmit external mechanic or hydraulic reciprocating forces into internal reciprocating fluid movements in a closed circuit over the conversion modules in the energy transforming unit.

BRIEF DESCRIPTION OF DRAWINGS

The invention is now described, by way of example, with reference to the accompanying drawings, in which:

FIGS. 2a-j disclose examples of embodiments where the invention with straight cylinders and bellows with through-going piston shafts can create open reciprocating volumes over the central unit comprising conversion modules where the surroundings is the only volume absorbing compliance chamber in a cycle of operation open to the surroundings, and how shut-off valves (latch valves) with engines can be integrated in the central units.

FIGS. 3a-f, h-m disclose examples of embodiments where the invention with straight cylinders and bellows can create open reciprocating volumes over the central unit comprising conversion modules between one inner and one, towards the surroundings, open compliance volume.

FIG. 3g disclose examples on how a one-way valve can be arranged so the inner compliance chamber always has a high vacuum by using the piston return motions to force out possible leakage through the valve when applied by external pressure. The valve can also be arranged so that the returning motions of the piston besides creating high vacuum also can create hydraulic deceleration at the end of the piston motion.

FIGS. 4a-e disclose examples of embodiment where the invention with two mechanically connected restriction devices comprising straight cylinders, bellows and back springing elastomeric cylinders divides enclosed reciprocating volumes over the central unit comprising conversion modules which, in cooperation with the surroundings, create a closed reciprocating cycle of operation where the surroundings is the common compliance chamber. Thus, in these and following figures, the reciprocating volume is in some way sealed off from the surroundings of the energy transforming unit.

FIGS. 5a-e disclose examples of embodiments where the invention with two mechanically connected restriction devices comprising bellows and back springing elastomeric cylinder divides hermetically enclosed reciprocating volumes over the central unit comprising conversion modules which, in cooperation with the environment with absolutely sealed piston shaft lead-throughs, create closed divide reciprocating cycle of operation where the surroundings is the common compliance chamber.

FIGS. 6a-e disclose examples of embodiments where the unit with two mechanically connected restriction devices comprising straight cylinders with pistons and bellows with piston like end closures which with their movements coupled to the incoming external forces creates divided reciprocating volumes over the central unit comprising conversions modules between two separate compliance chambers; one inner and one, towards the surroundings, cooperative compliance chamber.

FIGS. 7a-e disclose examples of embodiment where the invention with two mechanically connected restriction devices comprising straight cylinders, bellows and back springing elastomeric cylinders with piston like end closures creates divided reciprocating volumes over the central unit comprising conversion modules which in similarity with the embodiment in FIGS. 6a-e can store and deliver energy under hermetically sealed conditions.

FIGS. 8a-e, f-j disclose further examples of embodiment where two opposite internal compliance chambers can interact with the fluid there between which is divided from the compliance chambers by at least one sealing cylinder and piston function, so that external forces applied on this piston generate a buildup of pressure gradients for storage and release of energy.

This stored energy can be released as pulling and/or pushing forces that are transformed into rotations by the conversion modules.

FIGS. 9a-e disclose examples of embodiment where one of the two internal compliance volumes of the invention can obtain altered characteristics by connecting a service volume with fluid and gas pumps to the energy transformer. Further, it is disclosed examples on piston shaft lead-throughs and fluid locks to absorb eventual uneven load and to prevent gas leakage.

Figures 1A, 1B, 1C, 1D, 1E:
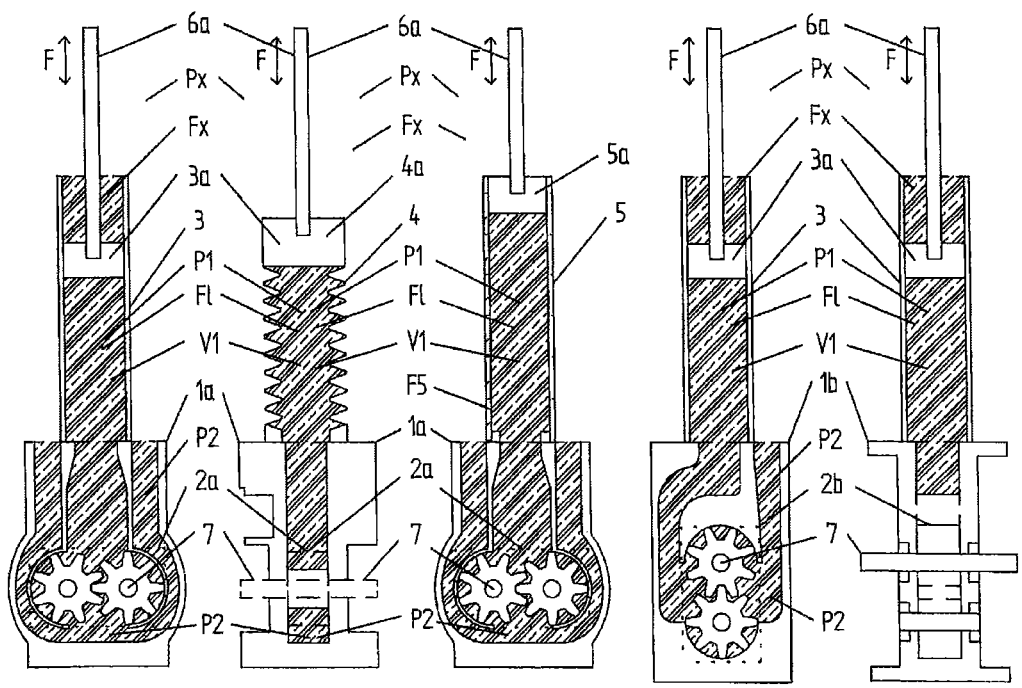
FIGS. 1a-j disclose examples of embodiments where the invention with straight cylinders and pistons as well as bellows and back springing elastomeric cylinders with piston like end closures can create open reciprocating volumes over the central unit comprising conversion modules where the surroundings is the only volume absorbing compliance chamber in a cycle of operation open to the surroundings.
Figures 10A, 10B, 10C:
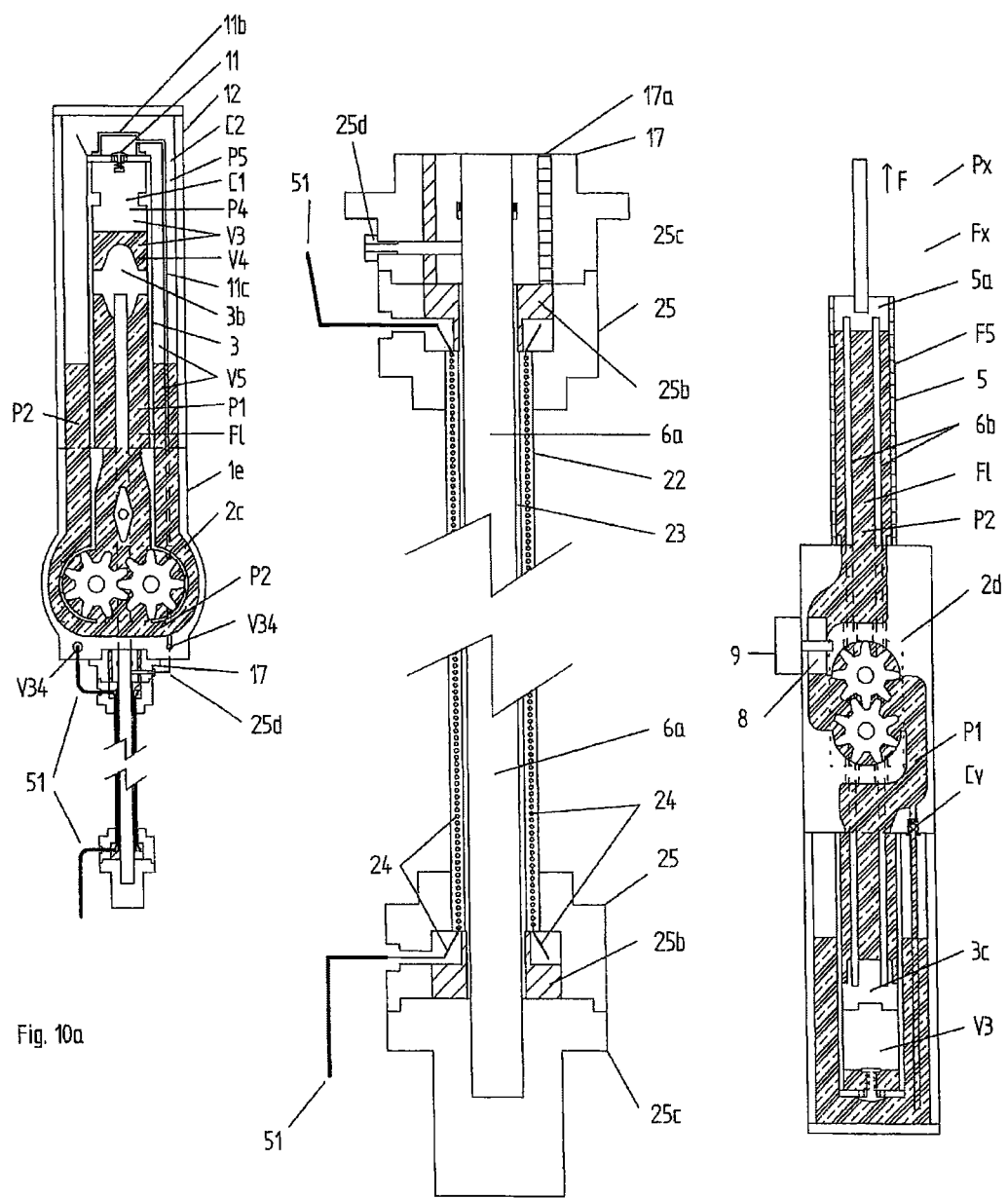

FIGS. 10a-c disclose examples of embodiments where the invention has been provided with an elastic spiral shaped armored elastomeric pipe or cylinder which covers the through-going piston shaft to prevent fluid leakage and gas migration from the energy transformer, and where the spiral armoring, in similarity to the elastomeric cylinder in FIG. 1c, also can comprise or contain conducting material in separate groups for current and signal transmission.

Figure 11A:
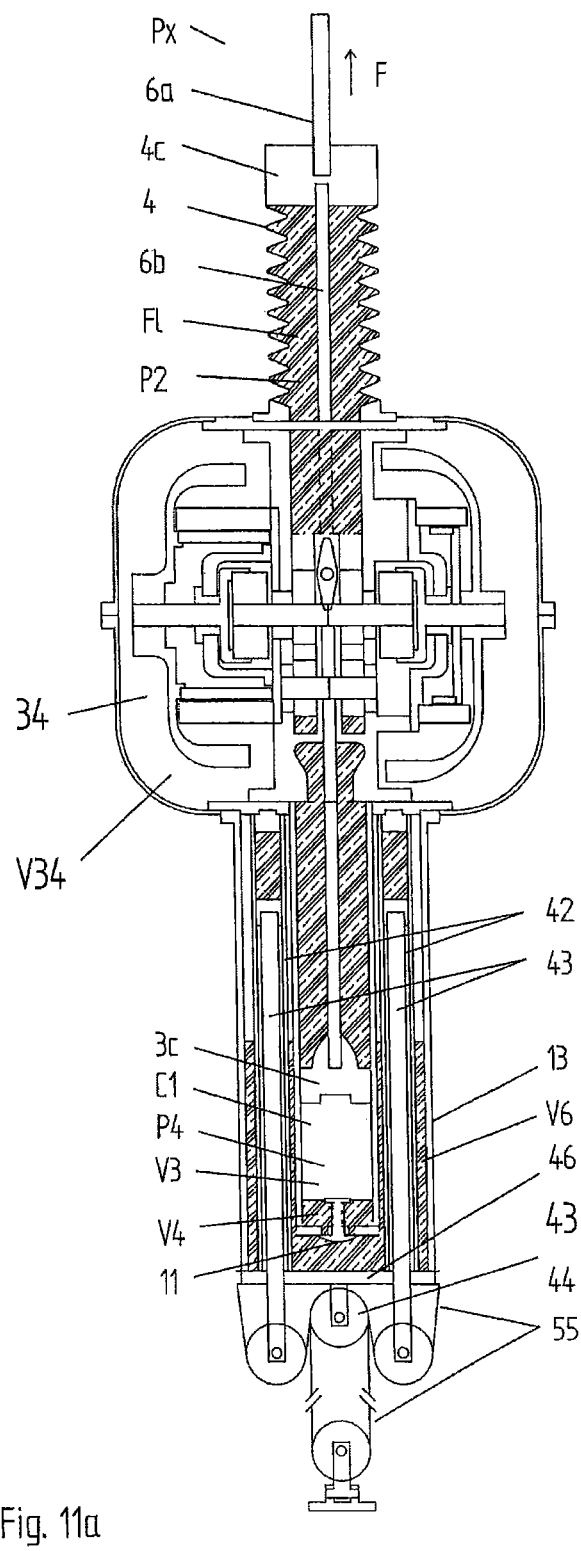
Figure 17A:
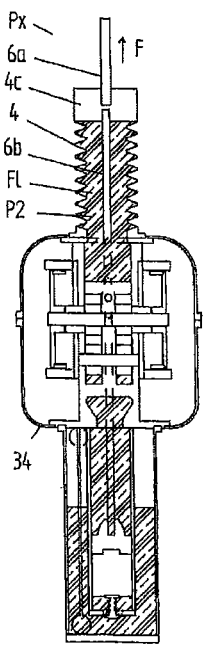
Figure 17B:
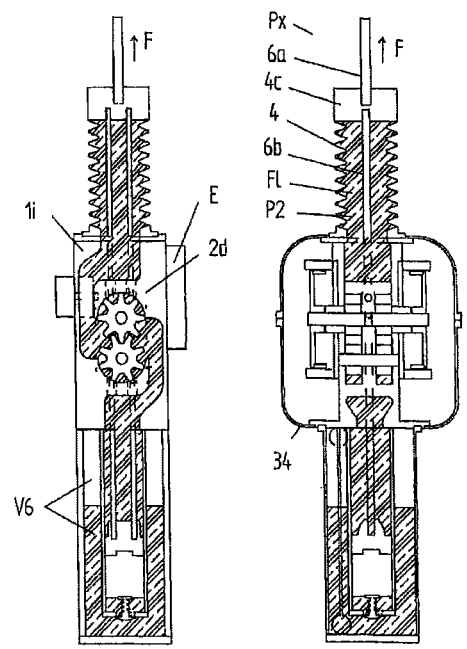

FIGS. 11a-c disclose how an energy transforming unit, through a variable anchoring system, integrated in a floating buoy or in a pivoting attachment to a buoy, can be attached to adapt the arrangement to different sea levels.

FIGS. 12a-d disclose examples on energy transformers where the invention with straight rigid or slightly elastic outer cylinders are creating an inner reciprocating cycle of operation over the central unit comprising conversion modules, which in principle only need inner or outer compliance volumes which can absorb the displaced volume from the piston shaft.

FIGS. 13a-d disclose examples on energy transformers where the invention with restriction devices in the shape of straight cylinders are creating an inner reciprocating cycle of operation over the central unit, where the pistons have been equipped with opposite piston shafts which, due to balanced piston shaft cross section areas, do not create any changes in volume in the reciprocating circulation system.

FIGS. 14a-b disclose, in two projections, examples of embodiments according to the invention where a revolving cylinder equipped with a restriction device in the shape of a wing have been adapted to a central unit, so that an internal enclosed reciprocating cycle of operation over the conversion modules is created with two power outputs at a right angle against the revolving cylinder suitable for connection to a generator.

FIGS. 15a-b disclose, in two projections, examples of embodiments according to the invention where a revolving cylinder equipped with two wings, to avoid damaging side forces, have been adapted to operate two central units. Thus, two separate internally enclosed reciprocating cycles of operations over two separate conversion modules is created, each with one power output at a right angle against the extended axis of the revolving cylinder suitable for connection to a generator.

FIGS. 16a-f disclose examples on how conversion modules attached to electrical generators with or without free wheel and associated fly wheel can be integrated in central units with horizontally oriented conversion modules.

FIGS. 17a-d disclose examples on how conversion modules attached to electrical generators with or without free wheel and associated fly wheel can be integrated in central units with vertically oriented conversion modules.

Figure 18A:
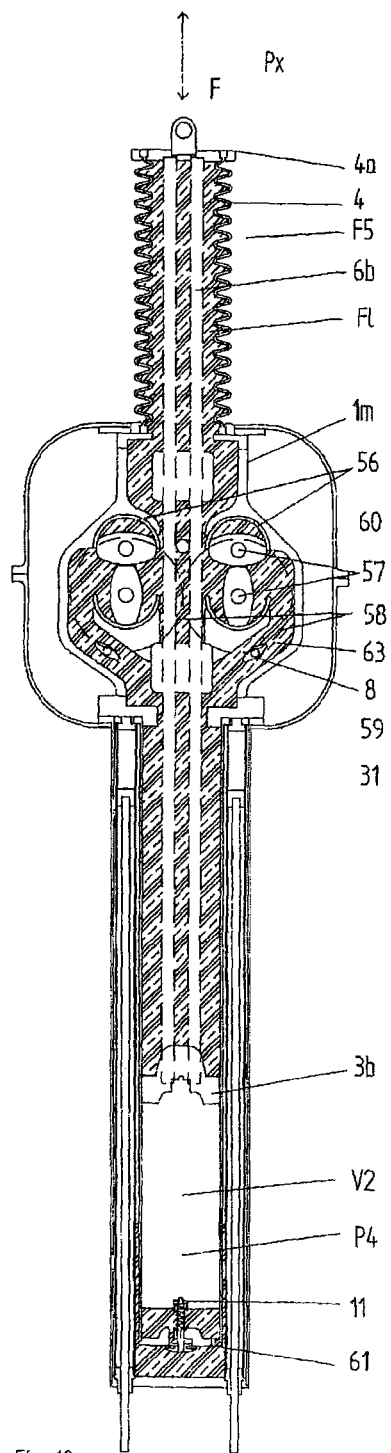
Figure 18B:
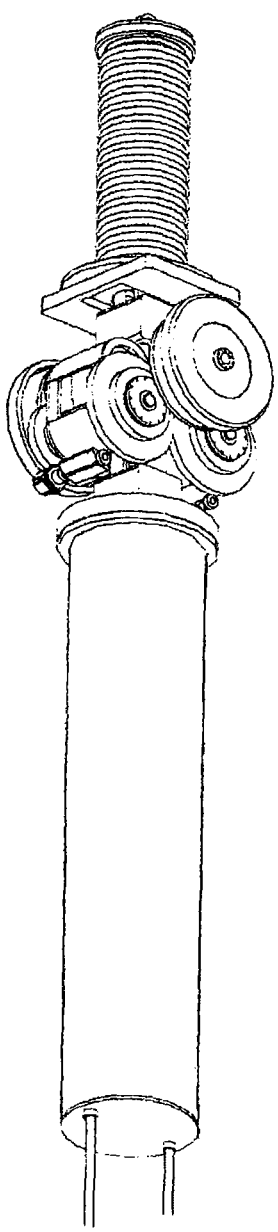

FIGS. 18a-b disclose examples on an energy transforming unit wherein one of the two restriction devices is a bellow and where the conversion modules are two lobrotating pumps.

Figure 18C:
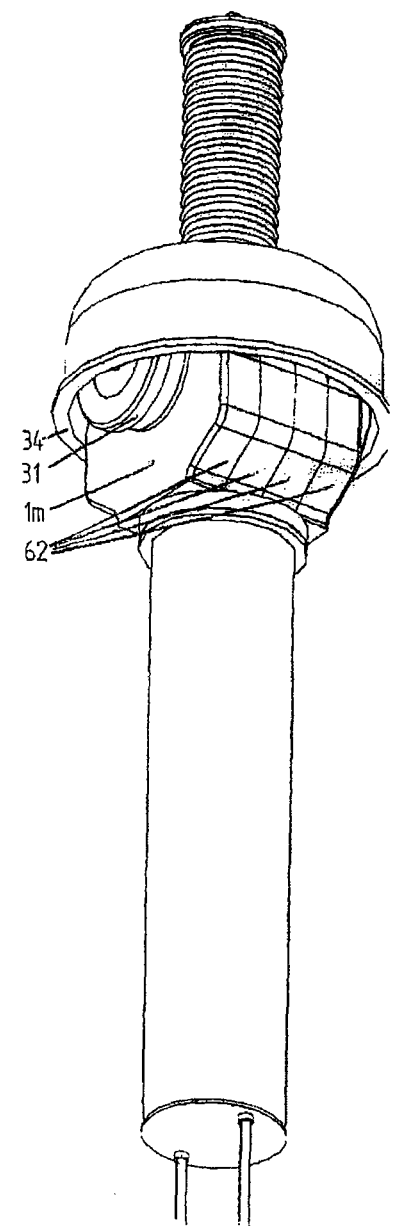

FIG. 18c discloses examples on how the central unit can be constructed of several slices.

FIGS. 19a-c disclose examples of an energy transforming unit where one of the two restrictions devices comprises an elastomeric cylinder and where one mechanical conversion module having the shape of a gear rack is used.

FIGS. 20a-e disclose examples of an energy transforming unit where one of the two restriction devices comprises an elastomeric cylinder and where the mechanical conversion modules are operated by one or more chains.

Figures 21A, 21B, 21C:
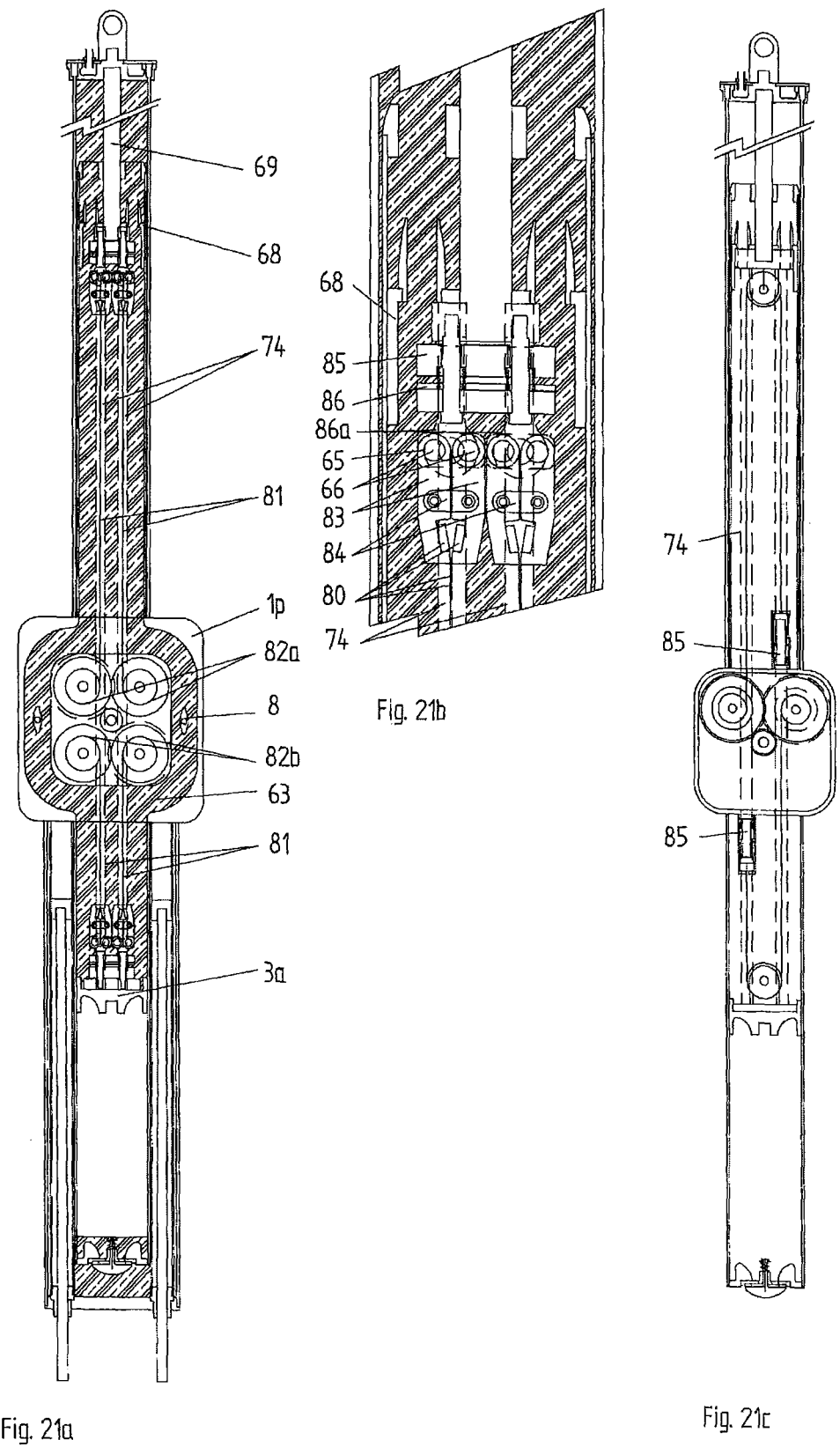

FIGS. 21a-c disclose examples of an energy transforming unit where one of the two restriction devices comprises an elastomeric cylinder and where the mechanical conversion modules are operated by one or more up- and unwinding bands.

Figure 22A:
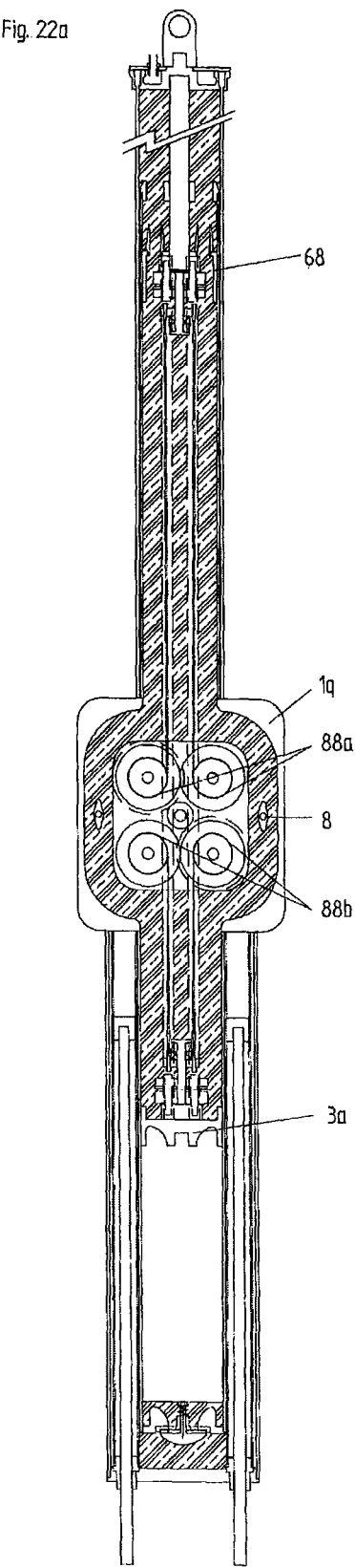
Figure 22B:
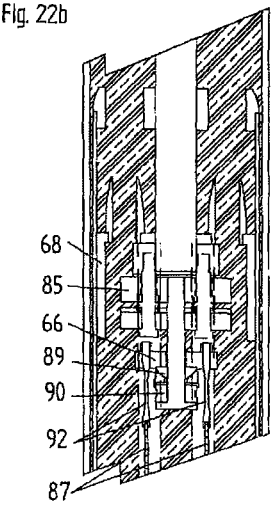

FIGS. 22a-b disclose examples of an energy transforming unit where one of the two restriction devices comprises an elastomeric cylinder and where the mechanical conversion modules are operated by one or more steel or synthetic lines with small diameters and thin wires.

FIGS. 23a-d disclose preferred basic embodiments of the invention.

In general, one separate figure can comprise projections in different planes in order to illustrate functions and orientations.

DETAILED DESCRIPTION OF EMBODIMENTS

In the following a detailed description of embodiments of the present invention will be given. It will be appreciated that these figures are for illustration only and are not in any way restricting the scope of the invention. Thus, any references to direction, such as "up" or "down", are only referring to the directions shown in the figures. Also, any dimensions etc. shown in the figures are for illustration purposes.

It must be noted that, as used in this specification and the appended claims, the singular forms "a," "an," and "the" include plural referents unless the context clearly dictates otherwise.

Elasticity is to be understood as a materials ability to deform in an elastic way. Elastic deformation is when a material deforms under stress (e.g. external forces), but returns to its original shape when the stress is removed. A more elastic material is to be understood as a material having a lower modulus of elasticity or Young's modulus. The elastic modulus of an object is defined as the slope of its stress-strain curve in the elastic deformation region. The elastic modulus is calculated as stress/strain, where stress is the force causing the deformation, divided by the area to which the force is applied; and strain is the ratio of the change caused by the stress.

The invention, which relates to a compact, cost effective energy transformer, comprises in its preferred embodiments one central unit comprising mechanics and fluid channels which have been adapted for reciprocating mechanical movements and oscillating volume transferring fluid and or mechanical movements generated by at least one integrated restriction or displacement device over conversion modules integrated in the central unit.

Figures 1F, 1G, 1H, 1I, 1J:
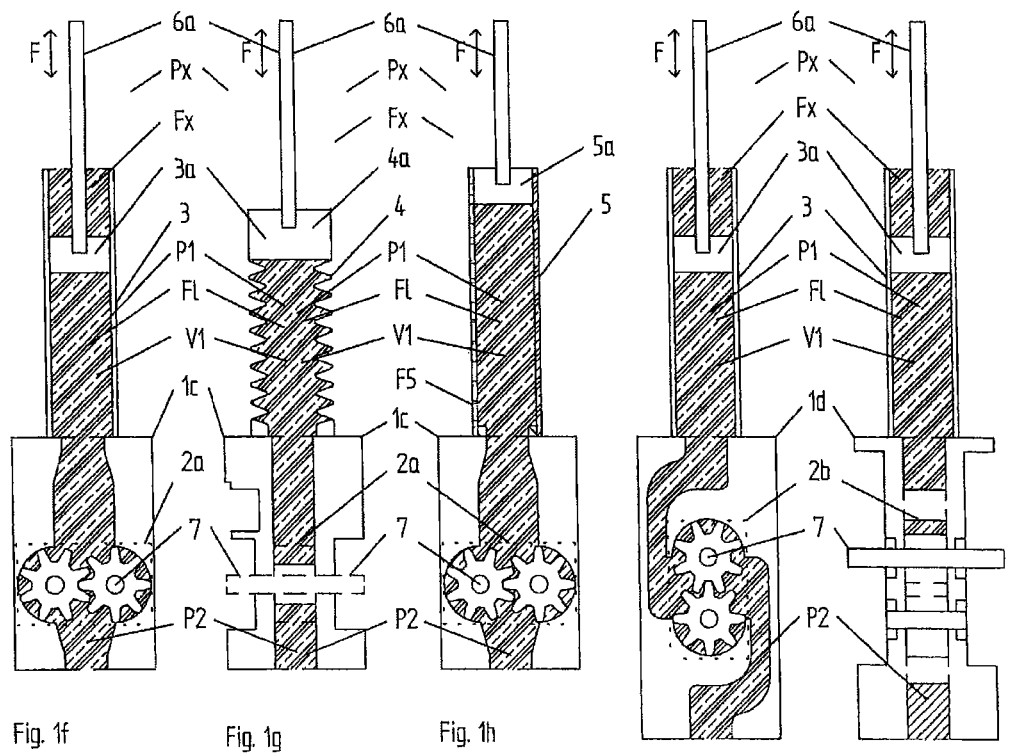

In some embodiments the restriction devices interact with themselves in open (FIGS. 1-2) or closed (FIGS. 12-15) cycles of operation or interact in other embodiments (disclosed in the other figures) with at least one compliance chamber. The restriction devices can comprise, for example, straight cylinders with pistons, enclosed bellows, back springing elastomeric cylinders or revolving cylinders with rotating pistons or rotators. The conversion module can comprise inwards and outwards facing gear driven pumps, lobrotating and wing pumps adapted for reciprocating fluid movements. These can, by using a pipe system through the embodiments of the central unit, transform reciprocating fluid movements into rotating output forces suitable for mechanical work (FIGS. 1-17) and/or as in FIGS. 2-23 to participate in a flow system integrated in the central unit comprising shut-off or latch valves. The integrated cut-off valves, latch valves, are adapted to optimize the power output from the energy output from for example wave movements and in an effective way transfer this energy into movement which can be transferred into mechanical work and the production of for example electric power. The reciprocating volume transferring fluid movements may, as disclosed in FIGS. 2-23, be a part of an integrated system for hydraulic end stop which does not expose the central unit with damaging pressures and forces.

The energy transformers can be adapted for ingoing one-way or double acting pressing and/or pulling forces. When adapted for one-way acting forces, for example when the system receives and stores wave energy only during the up-going phase of the waves, the energy transforming unit can be provided with at least one internal compliance chamber, the volume of which changes, directly through a piston device (ex FIGS. 6c, d) or indirectly through a piston an fluid movement (ex 6a, b), are connected to the incoming forces movement of the same towards a second externally (FIGS. 6, 7) or internally (ex FIG. 8) arranged compliance chamber. Thereby it is possible for the one-way acting forces to be translated to double acting forces transferred to reciprocating fluid and or mechanically transferred movements over the conversion modules in the central units. The central units are thereby exposed for smaller and more even forces. If both the pistons of the two mechanically connected restriction devices are sealed towards their respective compliance volumes the fluid in between them can be set to a suitable pressure, for example to the pressure in the service volume. This can be done by making a flow connection between the conversion module and service volume. When the oscillating liquid flow is transforming the energy to the conversion modules (FIGS. 1-18) this interconnection can be equipped with a one way valve that does not allow flow from the conversion modules but does allow flow into them in order to prevent cavitations around the conversion modules. When reciprocating mechanical units (FIGS. 19-23) are transforming energy to the conversion modules the interconnection will create a pressure relief in the conversion modules that reduces the separation forces within the central unit that makes it lighter, cheaper and easier to construct.

The construction of the energy converter is well suited for hermetically sealed systems (ex. FIG. 11a) where bellows and elastomeric cylinders in an interactive way are cooperating with the pressure of the surroundings and the pressure in the internal compliance chamber in order to transform one-way acting forces into double acting forces within the transformer. The energy transformers are further suitable for as well pulsating as continuous energy output and can be provided with electronic modules which can control and optimize the energy production as well as transmit and receive information.

Since the energy transformer, with assistance of for example the integrated latch valve and adapted hydraulic and mechanic conversion modules, can convert reciprocating movements into a rotating torque with a relatively high rotation speed the conversion modules become small and light and are therefore easy to integrate with the central unit.

The central unit can also comprise conversion modules having the shape of linear generators which directly can transform mechanical reciprocating movements into electric power. The advantages of still using a reciprocating fluid in such an application, is that latch valves, and hydraulic end-stops can be used with no negative effects to the internal environment.

FIGS. 1a-j, 2a-j disclose in two projections, examples of embodiments of central units 1a-j comprising one or several conversion modules 2a-e constructed according to the principles of inner and outer gear wheel pumps, lobrotating pumps or wing pumps adapted to reciprocating fluid movements. In this and following embodiments, the conversion modules comprise two connected gear wheels which in single sets, depending if they are horizontally or vertically arranged, are named 2a and 2b in FIGS. 1a-j and in double sets are named 2c and 2d in FIGS. 1a-d and 2f-j, or as several sets 2e in FIGS. 2e-j. The central unit can be described as a volume which encloses and provides at least one conversion modules with in- and outputting flow channels which are adapted for at least one direct acting restriction device, such as for example a straight cylinder 3 or bellow 4 with pistons 3a-3; 4a-d or a back spring elastomeric cylinder 5 with a cylinder top 5a. The pistons and the cylinder top 5a divide, together with the conversion modules 2a-e a variable enclosed reciprocating volume V1, comprising the fluids Fl and Fx, which in this embodiment are the same fluid. The volume V1 passes entirely through the conversion modules 2a-e. The pistons generates in an open collaboration with the surrounding fluid Fx a variable pressure P1 when they, via the piston shafts 6a, 6b, are provided with double-acting forces F. The pressure P2 on the other side of the conversion modules is in these embodiments the same as the pressure Px of the surrounding fluid. The surrounding fluid can in principle be closed to the surroundings by a flexible connection (not shown), if for example the reciprocating fluid Fx is purified water. The conversion modules in the central units directly translates the reciprocating flows into rotational axle movements 7 suitable for mechanical work such as for example direct operation of generators.

FIGS. 2a-j further disclose examples on how the pistons 3a, 4a can be formed 3b-d resp. 4b-d so that they cooperate with the respective central units and the cooperating end stop creates a hydraulic damping B1, B2 when the pistons are approaching their end stops on their way towards and from the respective central unit. This provides a soft deceleration of the power transmission. If a bellow is used as a reciprocating device, the piston 4d can be arranged so that is creates a hydraulic damping B1 which also reduces the pressure in the fluid Fl enclosed by the bellow. With the assistance from the engines 9 and the integrated shut-off valves, also called latch valves 8, arranged in the flow channels of the central unit, the flows over the conversion modules can be held back until their pressure gradients and calculated flows over the conversion modules are optimized for maximum energy extraction from the added forces F. Cavitation can be avoided by letting a pressure sensor (not shown) register the pressure P1 and by letting electronics and software alter the load on the conversion modules so that the pressure does not fall below a predetermined minimum pressure. It is also possible to use restriction devices of a roll membrane type. However, these leads to a more bulky construction and do not provide any advantages compared to bellow type units therefore these embodiments are not disclosed further here.

FIGS. 3a-m disclose in one projection examples of preferred embodiments where an external cylinder 10 encloses the cylinder 3 or the bellows 4 so that an enclosed gas volume V2 with a pressure P2 is created, thus creating an internal compliance chamber C1. Alternatively, the straight cylinder 3 can itself be enclosed by a gable comprising a one-way valve 11, so that it together with the pistons 3b-c create a defined gas volume V3, which also can create the internal compliance chamber C1 with a pressure P4. The gas volume V2 can be made essentially larger than V3, which means that it can contain a pressurized gas without an increase in the pressure more than desired, when the reciprocating fluid Fl in the enclosed reciprocating volume V1 via the pistons 3a-3; 4a-c contracts the volume V2. The volume V3 has a more constricted volume and is very suitable to contain a gas with a powerful, nearly constant under-pressure during the whole piston stroke. A leakage over the pistons will sooner or later create a leakage volume V4 which may interfere with the gas volumes in the compliance chambers C1. This will not be the case in the embodiments according to FIGS. 31, m where the external cylinder (10), without lead-throughs for piston shafts, encloses the bellows 4. Embodiments with bellows do not endure so high pressure gradients and can lead to problems with gas migration over the elastomers. The leakage volume V4 can be removed manually or with small integrated electrical pumps (not shown). It can also be automatically removed with the assistance from the return movements of the reciprocating piston shown in FIG. 3c-f. The pressure P2 adopts the external pressure Px due to the open connection to the external fluid Fx. This adopted pressure will force the conversion modules (2a,b) to rotate in the other direction when the force (F) and pressure (P1) decreases below their balancing values over the conversion modules. At the end of the piston return the leakage volume (V4) will be forced out through the one way valve (11). Variations in the incoming force (F) will result in reciprocating fluid movements that directly within the central unit can be translated into rotating axle movements suitable for mechanical work. Cavitations can be avoided by letting a pressure sensor (not shown) register the pressure P1 and by letting electronics and software alter the load on the conversion module so that the pressure does not fall below a predetermined minimum pressure.

FIG. 3g discloses a detail view of how a one way valve 11 in connection with a groove in the piston 3b can be arranged to maintain a high vacuum in the straight cylinder 3. The high vacuum is maintained with the assistance of the piston return letting out an excess of fluid which has passed over the piston seals. At the same time, in some embodiments, to provide a valve which does not seal until enough fluid V4 has been sucked into the cylinder, so that there is always a possibility for a soft deceleration of the piston when it, with a reduced or inverted pressure gradient, presses out the leakage and thereby also the deceleration volume V4.

FIGS. 4a-e discloses in one projection examples of preferred embodiments where two restriction devices comprising; two straight cylinders 3, alternatively one bellow 4 and one straight cylinder 3, alternatively one back spring elastomeric cylinder 5 and a straight cylinder 3 where the pistons 3b-b, 3c-c, 4b-3b, 4c-3c and 5a-3c are connected to each other by the piston shafts 6b and divides the fluid Fl into the reciprocating enclosed volume, which can be separated from the external fluid Fx. The pistons and the fluid Fl creates, over the intermediate conversion modules, a circulation system with feed-back to the surroundings where double acting forces F applied to the pistons creates reciprocating fluid movements that directly within the central unit can be translated into rotating axle movements suitable for mechanical work.

When the back spring elastomeric cylinder 5 is in work (FIG. 4e), the back spring force F5 can contribute to returning piston movements so that also one-way acting forces can be translated into rotating axle movements suitable for mechanical work.

Embodiments with two opposite straight cylinders (FIGS. 4a-b) of preferably the same size can handle higher pressure gradients over the conversion module in both directions. Embodiments with only one straight cylinder (FIGS. 4c-e) can only handle high pressure gradients of the conversion module in a direction towards the opposite bellows 4 or the back spring elastomeric cylinder 5. In the other direction, the manageable pressure gradient depends on the pressure the elastomers are able to withstand. The feed-back circulation system over the surroundings results in that its pressure cannot be used as a support for the elastomers. Because the piston shafts 6b, in principle, are located in the enclosed reciprocating volume between the pistons, the feed-through of the pistons shafts through the central unit do not need to be absolute. The central units are therefore only provided with slide bearings containing labyrinth bearings which provide a long and extensive support for the piston shafts.

Because the reciprocating fluid Fl over the conversion module is an enclosed volume between two mechanically connected restriction devices, this volume, with or without pressure sensors, can be provided with a constant overpressure on each side of the conversion module without affecting the pressure gradients the force F generates. In this way cavitation over the conversion module can be avoided. The constant overpressure can for example be constituted of the surrounding pressure Px or be created by internal pressure arrangements shown in FIGS. 9, 10, 12, 13. These pressures can, via one-way valves Cv on each side of the conversion module shown in FIG. 4a, pressurize the fluid Fl. The central unit can also be provided with a safety bypass valve (not shown) across the conversion modules to prevent too high overpressures.

FIGS. 5a-e disclose in one projection examples of preferred embodiments where two preferably opposite and against the surroundings hermetically enclosed restriction devices made by an elastomer which in collaboration with the surroundings generates reciprocating flows over the conversion module of the central unit.

The restriction devices can comprise two opposite bellows 4 (FIG. 5a) alternatively a combination of one back spring elastomeric cylinder 5 and an opposite bellows (FIG. 5b), the piston like arrangements 5a, 4a of which are hydraulically connected to each other by the reciprocating fluid Fl. In FIG. 5b the piston shafts 6b constitute a central support for the bellow 4. This embodiment can be suitable for more simple energy transformers and for example work as a flexible power producing link connected to a force transmitting elongated element, such as for example a mooring rope or an anchoring line.

The restriction devices can also, except for the hydraulic connection, be mechanically connected to each other with an external, not shown, arrangement or an internal arrangement like for example the piston shafts 6b, which also can constitute a stabilizing support of the bellows 4.

The embodiments create a, against the surroundings enclosed but interacting circulation system which require double action forces to generate reciprocating fluid movements. When the back spring elastomeric cylinder 5 is in work (FIG. 5e), the back spring force F5 can contribute to returning piston movements so that also one-way acting forces can be translated into rotating axle movements suitable for mechanical work.

In the embodiments where the opposite pistons 5a, 4b-c are mechanically connected by the piston shafts or profiles 6b the force F can switch direction and can also endure higher pressure gradients over the converters than the embodiments without a mechanical connection. This due to that the mechanically connected pistons generates pressure gradients which operate the conversion module by pressure increasing on one side of the conversion module, simultaneously with pressure reduction on the other side. Cavitation is avoided by letting the external pressure Px, without a need of feed-throughs, constantly pressurize the fluid Fl indirectly over the elastomers.

FIG. 6a-e discloses in one projection examples of preferred embodiments where double restriction devices, comprising straight cylinders 3 and bellows 4, creates enclosed reciprocating volumes over the conversion module 2c, 2d together with the, by the piston shafts 6b connected, pistons 3b in FIGS. 6a, 6d, the pistons 3c in FIGS. 6b, e and the pistons 3c, 4c in FIG. 6c. At the same time one of the restriction devices create an internal compliance chamber C1, which through the connected pistons are in connection with an external open and with the surroundings connected compliance chamber so that an internal energy storage can take place for energy extraction and the return movements of the pistons. Thereby a pressure gradient is created between the inner and outer compliance chamber, which can be used as stored energy without affecting the conversion modules 2c, 2d during for example incoming one-way forces, so that double acting forces with a more even force distribution is affecting the conversion modules.

The by the pistons enclosed fluid Fl which entirely or partly passes through the conversion module can by the force F be put in reciprocating movement over the conversion modules between the compliance chambers C1 with pressures P3 or P4 and the outer surroundings with the fluid Fx and pressure Px as compliance volume. The reciprocating fluid Fl is separated from the external fluid Fx by a piston 3b, 3c and can therefore be chosen so that it in an optimized way protects the conversion module from wear out. Cavitations can by the connections Cv be avoided according to the same principles as described in FIGS. 4a-e.

FIG. 7a-e discloses in one projection examples of preferred embodiments where the fluid Fl between the two mechanically connected pistons reciprocates between the by the cylinders 10, 3 internally created compliance chambers C1 with pressures P3 and P4 and by the by the bellows 4 and the back spring elastomeric cylinder 5 created outer compliance chambers. The outer compliance chamber can be the surroundings, i.e. air or water with their respective pressure.

By fixating the piston shafts 6a, b to the piston like end closures 4b, c and 5a, hermetically enclosed energy transformers are created according to FIGS. 7a-e.

The internal compliance chamber C1 is created by letting the gable provided cylinder 10 in FIGS. 7a-c to enclose the straight cylinder 3 or the bellows 4 with the piston 3b and 4c, respectively, this creates an enclosed volume V2 with the pressure P3 with or without fluid volume V4. In FIGS. 7c-e the straight cylinder 3 together with the valve 8 create an enclosed volume V3 which also can serve as an internal compliance chamber C1 with pressure P4.

By enclosing the internal compliance chamber C1 and its bottom valve 11 with a closed cylinder 13, a service volume V6 is created which can be filled with fluid and gas. The fluid is of the same kind as the reciprocating fluid H and the gas can be connected to the gas in the generator rooms (not shown). The service volume V6 can both deliver and receive fluid to and from the valve 11, and can thereby fulfill its double functions, i.e. to give the pressure P4 a maximum under-pressure and to give the pistons 3b, 3c a hydraulic deceleration near its end positions. The service volume V6 also provides a hermetical sealing against the surrounding for the embodiments according to FIGS. 7c-e and is used to add, restore, rearrange fluid and gas in the energy converter and unload or preset pressures in the conversion modules.

In the embodiments according to FIGS. 7a, c-e there will be a leakage over the pistons which together with the leakage volume V4 intrudes the gas volumes in the compliance chambers C1. The leakage volumes V4 can be returned to the reciprocating fluid F1 with small integrated electrical pumps R1. Cavitations can be avoided by the circumstance that the external pressure Px is indirectly pressurizing the fluid F1 through the elastomeric Cylinders. Cavitation can also be avoided by letting a pressure sensor (not shown) register the pressure P1 and by letting electronics and software alter the load on the conversion modules 2c, 2d so that the pressure does not fall below a predetermined minimum pressure.

The gas pressures P3 and P4 in the compliance chambers C1 are, by means of the connected pistons, in direct connection with the external fluid Fx and its pressure Px. The pressure of the surroundings Px is transmitted by the elastomers in FIG. 7a, d-e, more or less without pressure losses, to the reciprocating fluid F1. This results in that the pressure P2 adopts the external pressure Px with a very low progression. In FIGS. 7b-c the pressure P2 is created by the pressure of the surroundings Px and the back spring forces F5 of the elastomeric cylinder 5. The opposite pressure P1, on the other side of the conversion module, is a result of the forces the pressures P3 and P4 in the internal compliance chambers C1 develop against the piston areas and by the external forces F which affect the piston shafts 6a, 6b.

The pressures P1 and P2 can thus be balanced with one-way acting forces F applied on the pistons by means of the piston shafts 6a so that variations in the forces result in reciprocating fluid movements which directly within the central unit can be translated into rotating axle movements suitable for mechanical work. The pressure Px of the surroundings, the area of the pistons and the back spring forces F5 of the elastomeric cylinder 5 are parameters which together with the pressures P3 and P4 in the compliance chambers C1 generates pressure gradients over the conversion modules.

The pistons shafts 6a can for example, when connected to a floating buoy with a displacing volume, create pulling forces F which balances these pressure gradients. During imbalance due to wave movements, the pressure gradients over the conversion modules are altered so that they rotate according to the shifting directions of the pressure gradients. With the assistance of the shut-off valves 8 the flows over the conversion module can be stopped until the pressure behind a calculated flow over the conversion module is large enough to deliver an optimized energy transformation from the pistons with their limited stroke. One way of increasing the operating pressures, without major changes, is to increase the pressure Px by placing the energy transformer at a larger depth.

The embodiment in FIG. 7b does not endure so high pressure gradients which may lead to gas migration over the elastomers. Remaining embodiments can endure high pressure gradients over the conversion module if the external pressures Px, which principally are transparent through the elastomers, are high.

FIGS. 8a-j discloses in one projection examples of preferred embodiments where the fluid F1 reciprocate between two internal compliance chambers C1, C2 and where only the displacing volumes from the piston shafts 6a are interacting with the surroundings. The compliance chamber C2 is created of preferably a cylinder 12 enclosing the gas volume V5 with the pressure P5 which directly or indirectly affects the pressure P2 in the reciprocating fluid F1. The two separated and opposite internal compliance chambers C1, C2 can interact by the intermediate fluid F1 which is limited from the compliance chambers by at least the sealing cylinder 12 and a piston function so that external forces acting on this piston leads to the buildup of pressure gradients for storage and release of energy into and out from the two compliance chambers. When using double constrains of the reciprocating fluid F1 towards the two internal compliance chambers C1, C2 with connected piston and cylinder functions, the risk of gas mixing is reduced. This arrangement with double pistons also provide excellent guiding for the incoming piston shaft 6a and makes it possible to construct effective hydraulic brake functions in the end positions of the energy transformer. Two internal compliance chambers C1, C2 entail that the pressure gradients created between these chambers can be pre-set and automatically adjusted so that an optimized energy extraction can be performed.

In the embodiments according to FIGS. 8a-d, the pressure P5 is transmitted directly by the fluid F1 and the elastomers to one side of the conversion modules 2b, 2c. The pressure P1 on the other side of the conversion modules is created by the forces the pressures P3, P4 in the internal compliance chamber develop against the piston areas and by the external forces F which affect the piston shafts 6a, 6b. The pressures P1 and P2 can thus be balanced with one-way acting forces F applied on the pistons by means of the piston shafts 6a so that variations in the forces result in reciprocating fluid movements which directly within the central unit can be translated into rotating axle movements suitable for mechanical work.

In the embodiments according to FIGS. 8e-i, the pressure P5 and flows to and from the compliance chamber C2 is transmitted indirectly to the gas pressures P3 and P4 and flows to and from the internal compliance chambers C1 is transmitted by elastomeric bellow and/or regular cylinder, the pistons of which with attached shafts or profiles 6b are mechanically connected to the pistons which are in contact with the compliance chambers C1. The pistons delimit an intermediate fluid F1 which can emerge energy by reciprocating movements over the conversion modules 2d. If the piston area are different or varies in size, which is always the case when bellows are used, their movements leads to different stoke volumes and flow. This difference in flow can by a bypass conduit bp, for example passing through a fluid cleaning system (not disclosed), can be directly connected to the compliance chambers C2 so that a partial cleaning of the fluid always are performed. In the embodiments disclosed in FIGS. 8f-h, the inner cylinder 3 and the piston 3c entail that the reciprocating fluid F1 is not exposed to unnecessary contact with the gas in the compliance volume V5 and that the outgoing piston shaft 6a have an excellent guidance. Similar to the other embodiments, the pressure gradients created by the pressures P1 and P2 can be balanced with one-way acting forces F so that the reciprocating fluid movements created directly within the central unit can be translated into rotating axle movements suitable for mechanical work.

FIG. 8j discloses an enlargement of the assembled piston 4b. The components 4ba, 4bb, the spring 4bc, together with the fluid F1, the damper volume V4 and the adjustments 4bd on the gable of the cylinder 10 and 4be on the piston shaft 6a form hydraulic damping functions when 4ba meets 4bd, alternatively when 4bb meets the end stop 4bf in the central unit 1h. This, leads to a soft deceleration and a reduction of the fluid pressure towards the bellow in its end position towards and from the central unit.

To have a long life all embodiments require an associated service volume (see embodiments according to FIGS. 9-10) comprising fluid, gas, mechanical and electrical components for manual and/or automatic control, steering, service and communication functions. Cavitation can for example be avoided by preventing unnecessary turbulence between the gas and the fluid phase in compliance chamber C2, for example by placing a floating damping material, like a coalescence filter (not disclosed) on the fluid in the embodiments according to FIGS. 8a-d. Physiologically dissolved gas is prevented from expanding by letting a pressure sensor (not shown) register the pressure P1 and by letting electronics and software alter the load on the conversion module so that the pressure does not fall below a predetermined minimum pressure. In the embodiments according to FIGS. 8e-i, cavitations can be avoided in the same way as described in FIGS. 4a-e.

FIGS. 9a-e disclose in one projection examples of preferred embodiments where integrated or external service volumes V6 are connected to energy transformers with two internal compliance chambers C1 and C2. FIGS. 9a, 9b disclose embodiments where the compliance chamber C2 is created by the closed cylinder 12 with the lead-throughs 14 and 15. The compliance chambers C1 are enclosed by the closed cylinders 13, creating the service volume V6. FIGS. 9d, 9e disclose embodiments where the compliance chambers C2 is created by the closed cylinder 12 which, without lead-throughs, encloses the internal compliance chamber C1.

In these embodiments, the closed cylinder 13 with its lead-throughs 17, can be connected to the central unit so that the service volume V6 encloses the piston shafts 6a, 6b. The service volume can also, as disclosed in FIG. 9d, be connected to the central unit 1e as a separate unit.

The lead-throughs 14, 17 in FIGS. 9a and 9d, e have natural fluid locks against the gas phase V5 in the compliance chamber C2. The lead-through 15, enlarged in FIG. 9c, must however be provided with a built-in fluid lock to prevent gas leakage from the compliance volume to the surroundings, which is expected to have a lower pressure. This can be accomplished by providing a normal or elastic centered 17 hydraulic piston lead-through with a similar supplementary lead-through 18, so that an enclosed volume V7 is created between these. This volume can be filled with the fluid F1 by the connection 19, whose pressure and flow is generated by the pressure gradient over, in this example, the conversion module 2d in the central unit 1i. Surplus of fluid flowing through the non-return valve 20 is laid flat onto of the piston 3c and prevents, together with the piston seals directed towards the compliance chamber C2, that gas leaks in towards the reciprocating fluid F1. The non-return valve 20 prevents a return-flow over the volume V7 when the pressure gradient over the conversion module changes direction.

The valve 11 has in the embodiments in FIG. 9d,e been provided with a cover 11b which by a pipe system 11c communicate with the external or integrated service volume V6. A pressure gradient can be build up between the compliance chamber C2 and the service volume V6 which can assure that there is enough force to evacuate the damping and leakage volume V4.

The placement of the cylinders 3 and the pistons 3c in FIG. 9b implies that the fluid F1, between the mechanically connected pistons, can be pressurized with a constant basic pressure on both sides of the conversion module 2d in order to prevent cavitation according to previous explanations of FIGS. 4a-e. This basic pressure can for example be generated by the pressure acting in the service volume Vb. The cylinder 3 also stabilizes the piston shafts 6a, b and can also be included in a hydraulic end position damping B1.

In the embodiments according to FIGS. 9a, d, e, cavitations is avoided by the direct pressure impact from the compliance chamber C2 on to the fluid F1 and letting a pressure sensor (not shown) register the pressure P1 and by letting electronics and software alter the load on the conversion module 2c so that the pressure does not fall below a predetermined minimum pressure. The service volume V6 and the one-way valve 11 assures at the same time, by enclosing the straight cylinder 3 and the valve 8, that there is the right amount of fluid inside the cylinder 3 to generate an optimized under-pressure and for the hydraulic deceleration of the piston.

The fluid, limited and enclosed by the pistons being transformed by the pistons, receives superimposed pressures created by the forces F and is balanced by opposite forces generated by the pressures P4 and P5 in the compliance chambers C1 and C2. Variations in the force F result in that the superimposed pressures P1 and P2, on each side of the conversion module creates pressure gradients over these which can be translated in to a rotational mechanical work.

The service volume V6 is, by small fluid and gas pumps R1 and R2, also in contact with the compliance chamber C2. By manual and/or automatic control of these pumps located for example in the service module, fluid and gas can be transferred between the service volume V6 and the compliance chamber C2.

The pre-set basic pressure P5 in the compliance chamber C2 can for example be chosen so that the pressure gradient created between the compliance chambers C1 and C2 is balanced by a pulling force F which is created by the displaced water volume from a floating buoy on a water surface without waves. If, for example, the displaced water volume with the pulling force F in calm waters corresponds to 50% of the total buoyancy of the buoy, the wave movement will create oscillating force variations around the pre-set force F. These force variations can by low pressure changes and low pressure progressions in the compliance chambers C1 and C2 in principle directly be converted into rotational movements in the conversion modules.

Mainly by movement of fluid between the service volume V6 and the compliance chamber C2, the pre-set basic pressure can be changed in as well pressure as progression. If the compliance volume V5 is decreased by transmittance of fluid F1 from the service volume V6 to the compliance chamber 2, the pre-set basic pressure P5 and the progression of the pressure changes is increased due to a decreased compliance volume V5. The opposite happens if fluid is transmitted from the compliance chamber C2 to the service volume V6. This adjustment function can assure that the reciprocating movements of the fluid F1 happens within the possible stroke range of the pistons, i.e. makes it possible to continuously adapt the energy transformer after added forces and movements for optimized energy transformation.

In order to further exploit the limited stroke of the energy transformers in an optimized way, the shut-off valves or latch valves 8 with engines 9 have been integrated into the exemplified central units 1h, 1i, 1e, 1f. Large pressure differences and flows over the conversion modules enable high power outputs. With assistance from the shut-off valves 8, the flow over the conversion modules 2c, 2d can be stopped until the pressures and the limited flows over the conversion modules are large enough to let the pistons work their limited stroke for an optimized energy transformation. The latch valves can in this way transform sinus formed extraction forces to more square wave like forces for better force extraction from the waves, better use of the stroke length and faster rotation motions that makes e.g. electric generators to have better efficient rates.

With, for example, a maximized under-pressure P4 in the compliance chamber C1 and an adapted overpressure P5 in the compliance chamber C2, both with a basic setting for very low progressions, the pressure gradients of the energy transformers can be adapted so that it always is required a powerful pulling force F in order for them to be in an equilibrium. In this way, energy output can be generated by as well positive as negative wave movements, which gives a more uniform energy production, see FIGS. 16-17.

FIGS. 10a-c disclose in FIG. 10a in one projection examples of how a preferred embodiment of the energy transformer described in FIG. 9c comprises two internal compliance volumes C1 and C2 and with an detached service volume V6 and an elastically centered piston shaft seal 17 have been modified and complemented with an elastic elastomeric cylinder/tube 22 with a smaller gliding gap 23, which with lubricating fluids or polymers, with or without gas, encloses the piston shaft 6a. With this completion all energy transformers, with piston shafts exposed to the surroundings, can be made hermetically sealed. The tube covering the piston shaft may also comprise straight or spiral winded bellows (not disclosed).

FIG. 10b discloses an enlargement of the hermetically sealed lead-through in FIG. 10a. The risk of dissipation of gas from the compliance volumes by diffusion has been minimized by an underpressure in the gap 23, created by stretching of the elastomeric cylinder 22. The gap 23 is either filled by fluid from the transformers or either filled by gas through inverted diffusion, i.e. from the surroundings in towards the gap 23.

The elastomeric cylinder 22 can be armored by a spiral shape, where the armoring also can be composed of a conducting material and glass fiber for distribution of electric power and communication. The connections 25 can be attached to the elastomeric cylinder 22 by for example vulcanization or clamp couplings and can comprise connectors and attachments for power output and communication. Further, the connections can be so formed that the enclosed electrical components and joint couplings for communication and high current. The, electrical conduits enclosed in the elastomeric cylinder can comprise one or several coils separated by the material of the elastomeric cylinder. The conduits can also be enclosed by a separate own insulation coating. At higher currents several conduits can be connected in the connection means 25 which has an insulator 25b to protect the conduits and to protect and cover the adaption part 25c. The elastomeric cylinder is in this way provided with in and outlets for electrical conduits and communications 51. When spiral shaped bellows are used, the conduits can also be placed in separate spiral tubes which loosely or fixed follows the inner contour of the spiral shaped bellow.

In embodiments where the elastomeric cylinder 22 can be the object of non desirable over- or under-pressure, the elastomeric cylinder or bellow can be provided with a pressure releasing connection 25d. This connection can, with or without a one-way valve (not shown), be in connection with the service volume V6 or to the volume V34 which is created by the encapsulation 34 in FIGS. 11, 16 and 17 which can be a part of or in some fully encapsulated embodiment, as in for example FIG. 10a have been adapted to cover and to take over the functions of the service volume.

FIG. 10c discloses a preferred embodiment of a hermetically enclosed energy transformer as described in FIG. 7c. The, by the pistons 3c, 5a, divided fluid Fl reciprocates over the conversion modules 2d while the internal compliance volume V3 and the outer surroundings Fx is constrained by a straight elastomeric cylinder 5. The mechanically connected pistons does not need to displace equal volumes, since the elastomeric cylinder and also bellows can adjust their volumes in interaction with the surroundings, which mean that the reciprocating fluid F1, as well as the reciprocating piston shaft 6a in FIG. 10b, all the time provides the cylinder with a relevant incompressible support which also serves as a frictions decreasing film. The elastomeric cylinder 5 can, similar to the elastomeric cylinder in FIG. 10b, be provided with spiral wrapped electrical conduits and associated connections (not shown). Also embodiments with spiral wrapped bellows can be provided with electrical conduit according to the above. When using constructions with bellows, where the stroke volume varies with the length variations of the bellow, the opposite restriction device can be adapted so that the variations in stroke volume can be handled within its own reformation and deformation possibilities.

The elastomeric cylinder and spirally shaped bellows with its elastic conduit fulfills two important functions i.e:

1. It can provide hermetically enclosed energy transformers without any fluid leakage 2. Current supply and communication can be provided between the ocean surface and the bottom without cables that constantly are reciprocating up and down with large risk of weakening movements and mechanical damages.

FIGS. 11a-c disclose three examples of variable anchoring systems, where hydraulic cylinders 42 with pistons and piston shafts in a simple way can be integrated in the service volume of the energy transformer, created by the cylinder 13 to manually and automatically with the electronic module E (not visible in these projections) optimize the reciprocating basic positions of the energy transformer for changing water levels.

FIG. 11a discloses a hermetically enclosed energy transformer described in FIG. 7e which is adapted to be anchored at the bottom of the ocean in order for the surrounding pressure Px together with the pressure P4 in the inner compliance chamber C1, to balance a pulling force generated by a buoy on the ocean surface. The motion of the ocean waves generates a reciprocating motion of the pistons 3c, 4c and the fluid Fl enclosed there between. These motions shall, in order for an optimized utilization of the stroke of the pistons and the, from the floating buoy displaced volumes, reciprocate around a middle/basic position. This can to a lesser extent be adjusted by transferring fluid from the service volume V6 to the compliance chamber C2 earlier described in FIGS. 9a-e.

The integrated latch valves are controlled by the electronics module E (not disclosed) and their software which cooperates with the power electronics and its software and control. By the latch valves it is possible to delay the movements of the buoy in the flexion points of the waves until a displacement large enough has occurred around the basic position of the buoy. Thereby, the sinus shaped movements of the waves can be transformed into square waves. This results in that the limited stroke of the energy transformer can be used so that it with as large force and velocity as possible can transfer energy to the generators. The latch technique can also in harsh weather lock the movements of the buoy.

The piston shafts 43 can directly or indirectly by the wheels 44 and for example the wires 45 be connected to anchoring modules at the bottom of the ocean. A hydraulic pump (not disclosed) controlled by the electronics modules E and its software can transfer the pistons with the piston shafts 43 so that the energy transformer, by for example tidal variations, takes its location where an effective energy generation is possible. The variable anchoring system can also be used to protect the whole system during harsh conditions. If large adaptations are necessary (large tidal changes) the stroke of the pistons can be increased by extending the cylinders 42 which are allowed to pass through the gable plate 46 and/or complement the arrangement with the wheels and wires 44, 45 which, in the example, doubles the optimization possibilities of the energy transformer.

The whole transformer can be encapsulated in a, around the rotational axis, symmetrical capsule 34 which can be adapted so that the energy transformer receives a density that result in that the transformer easily takes the pulling direction given by the buoy when effected by waves, currents and winds. This means that eventual side forces on linear bearings are reduced to a minimum.

The internal environment of the energy transformer, including generators, can in a cost effective way be optimized for a long life and long service intervals. The gas included in the system can for example be $N_2$ in order to not oxidize the included components. The reciprocating fluid Fl can comprise the organic oil Tellus E 46 which at the same time is a perfect lubricant for all included components. When lobe rotor pumps are used the oscillating fluid can be water or a water based fluid. The encapsulation with associated automatic control, steer and service functions can even lead to a completely maintenance free power production until it is totally renovated or replaced (compare with encapsulated refrigerator compressors).

In FIG. 11b it is disclosed an example of a hermetically enclosed energy transformer according to FIG. 10b, equipped with the variable anchoring system, and integrated in a floating buoy 50. The hydraulic cylinders 42 with the pistons and pistons shafts 43 have been placed in the service volume V6 created by the cylinder 13 which with its gable 46 encloses the compliance chamber C2. Similar to the embodiment in FIG. 11a the electronics module E can both manually and automatically adapt the power producing position of the energy transformer after present water levels. The elastomeric cylinder 22, with the sliding gap 23 and the electrical conduits 24 can transfer high-tension direct current from the energy transformer to an electric conduit 51 down towards the anchoring in the bottom.

FIG. 11 c discloses a variant of FIG. 11. Instead of embedding the transformer in the buoy 50, the piston shafts 43 have been provided with a universal joint which is adapted to be coupled to the buoy so that can absorb the swaying motions of the buoy and thereby in a meaningful way relieve the piston shafts and bearings of harmful load. The spool like shape and the low mass of the energy transformer will hardly in a meaningful way effect the energy absorbing functions of the buoy. These, more or less floating, energy transformers can advantageously at place be used for gas and/or fresh water production. The variable anchoring system also result in that small depth variations within an anchoring area will be less critical for an energy transformer equipped with this system.

FIGS. 12a-d display in one projection, examples on principle embodiments where in FIG. 12a one open straight cylinder 3 with the piston 3a is enclosed by a rigid cylinder 12 so that reciprocating fluid Fl forming an internal closed feedback system coupled over the conversion module. The need of compliance volume V5 with pressure P5 is limited to the piston rod displaced volume and can be established within or outside the closed feedback system. The need of compliance volume can also be covered by one yielding construction e.g. a rubber cylinder 26 with limited expansion possibilities, FIG. 12b.

Conversion modules in this embodiment require, in order to provide reciprocating fluid motion over the conversion module, that double-acting forces F are applied on the pistons. The pressure gradient formed by the pressures P5 and Px over the piston shaft clear area can, in some embodiments with unidirectional forces, give returning forces large enough for the piston and fluid over, for example a conversion module with free hub features, shall return to the starting point.

The embodiments in FIGS. 12c-d have been provided with integrated service volumes V6 formed by the closed cylinder 13. The service volume V6 is, via small fluid and gas pumps R1, R2, in contact with the feedback circulation system to, manually and/or automatically, compensate for the loss of fluid over the piston shaft seals and the seals round the axis 7 of the conversion module and also to contribute to avoidance of cavitations according to earlier directions. The service volume V6 can also as in FIG. 11b comprise a freestanding container with the same functions. Two opposite energy transformers of this easy and compact embodiment can be well suited to for example be operated by wave tilters.

FIGS. 13a-d display in one projection, examples on principle embodiments where one open straight cylinder 3 with pistons 3b and 3c enclosed by one external rigid cylinder 12 with the lead-throughs 17 of the piston shaft 6a, so that the reciprocating fluid Fl forms one internal closed feedback circulation system over the conversion modules.

The need of compliance volume of the reciprocating fluid is reduced towards zero by providing the pistons 3b and 3c with opposite piston shafts 6b having a total area equal to the piston shafts 6a which penetrate the central units 1e and 1f. Due to that, no volume changes occur within the internal circulation cycle.

The embodiments in FIGS. 13c-d have been provided with a service volume V6 formed by the closed cylinder 13. It covers the lead-throughs of the piston shaft 6b. Service volume V6 can serve as fluid and gas depot and can, with its own pressure or with one small internal compliance tank 28 and a pump system, pressurize the fluid Fl to avoid cavitations and to automatically replace leakage over the axis 7 of the conversion modules and the seals round the piston shafts 6b.

Energy transformers in this embodiment demands, in order to be able to generate reciprocating fluid motions over the conversion modules that double-acting forces F act on the pistons.

FIGS. 14-15 display in two projections examples on two energy transducers formed by the central units 1k and 1l, with plain conversion modules of type 2a, 2b adjusted to a revolving cylinder TC with the external cylinder 35, gables 36, bearing and axis seals 37 and the rotor 38 and for desired integration of one or two generators.

In FIGS. 14a-b the rotor is provided with a wing 39 which dived the external cylinder 35 in two fluid filled chambers with pressures P1 and P2 and which providing the central unit 1k with reciprocating flow with pressures P1 and P2 over a conversion module of type the 2a. This embodiment gives access to two possible power outlets, parallel with the revolving cylinder axes. The surfaces of the wing 39 facing the respective chamber can be said to be two mechanically connected pistons or restriction devices with delimits the by the external cylinder 35 and the gables 36 enclosed reciprocating fluid Fl from the surroundings, so that an internal reciprocating volume is created over the central unit 1a-q.

In FIGS. 15a-b, the revolving cylinder is provided with two wings 39 that provide two opposite central units 11 with reciprocating flow with pressure P1 and P2 over two conversion modules of type 2b. These are equipped with a generator without a free hub and flywheels. Both embodiments can be equipped with integrated latch-valves 8 and engines 9 in the central units.

The revolving cylinders TC form in similarity with energy transformers described in FIG. 13a-d, closed circles of operation over the conversion modules which in principle do not need any compliance chambers. Reciprocating movements by the rotor, transferred by the lever or the pivotal plate 40, is transmitted directly through the fluid Fl to the reciprocating fluid motions over the conversion module 2a.

The revolving cylinder with two wings gives better balance against harmful uneven load on the rotor. The wings can be supplied with small raisings at the middle of the outflows to form hydraulic damping at the ends. The service volume V6 can be formed from an external unit attached to the energy transformer. It can serve as a fluid- and gas depot and with its own pressure or with an internal compliance tank 28 through a pump system which pressurizes the fluid Fl and prevents cavitations and automatically replace leakage over the seals 37 and the seals round the rotating axis 7 of the conversion module.

Energy transformers with revolving cylinder demands double-acting forces F to generate reciprocating fluid motions. Both the embodiments can be equipped with central units and conversion module suitable for one or two generators with or without free hub and fly wheel. These embodiments are well suitable to be integrated in wave tilter. They can also be included in a lever system where e.g. a buoy is raising a lever which return by its own weight.

FIGS. 16-17 disclose in principle how preferably two generator units, for symmetry and weight balance, can be connected to the conversion modules 2c, 2d with, in relation to the length axis of the energy transformer, horizontal and vertically arranged drive shafts 7. The connections to the conversion module 2a, 2b are the same if you use central units where these are included. The double-acting force transmitters gives, with latch valves 8, powerful and short switching periods which can be bridged by generator units 30 with free hub 29 and flywheel 31 which results in a leveled energy production. Without free hub and flywheel the generators are lighter and the transforming unit of the energy transformer receives a more compact and in rotation symmetrical enclosing 34, still with two generators for symmetry, but then it delivers a heavily pulsating energy production.

FIGS. 16a-f disclose examples on energy transformers as described in FIGS. 9a and 10a where the conversion modules 2c result in horizontally oriented drive shafts.

Figure 16A:
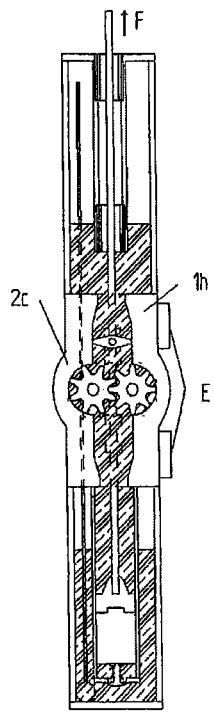
Figure 16B:
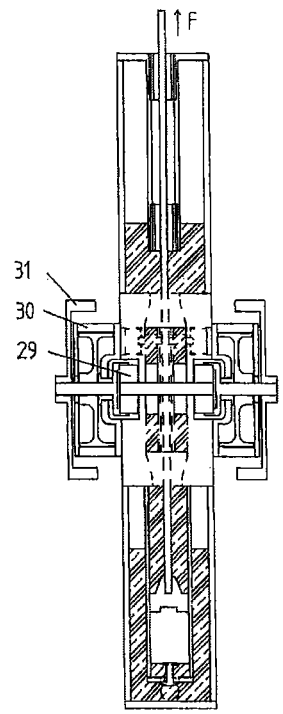
Figure 16C:
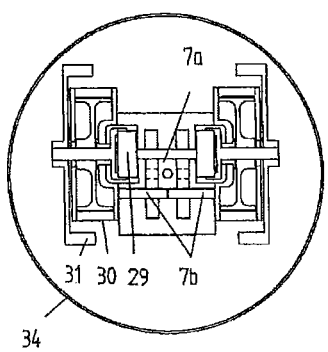
Figure 16D:
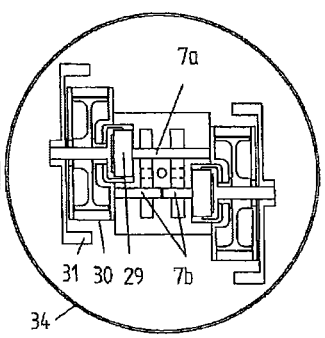

In FIGS. 16c-d, two generators units 30 have been equipped with free hub 29 and flywheel 31 so arranged that the conversion module 2c operates one generator when the transformer rotates in one direction and the other generator when it rotates the in the other direction. The rotors of the generators have also been provided with a flywheel 31 which stores and translates energy to these when the conversion modules stops to change direction. This leads to that the free hub for one generator releases the drive shaft while the free hub in the other generator grips the drive shaft. This embodiment delivers a leveled current supply with can be a good alternative when one or a few energy transformers are used to generate electric power.

In FIG. 16c the two generators 30 with free hub 29 and fly wheel are installed coupled to one common axle 7a operated by the cog wheels of the conversion module 4. This coupling provides the energy transformer with an asymmetrical weight and volume distribution but in the same time mean that the two opposite cog wheels can be connected with two separate axles 7b. This means that the matching of separate cog wheels and splines is not so critical and that the two cog connections each only is loaded with ¼ of the torque to the generator.

In FIG. 16d the generators are coupled to separate axles 7a, 7b. This means that the energy transformer receives a symmetrical weight distribution but that one of the two cog connections that operate the one generator must, with shared axles, transmit ¾ of the total torque to the generator which is located on the common axle. This increases the wear on the two involved cog wheels. If both generators are operated by non-divided axles, the two cog connections are loaded with only ¼ of the total torque each, but the matching of the opposite separate cog wheels and splines is very critical.

Energy transformers with central units 1a-d and conversion modules 2a-b according to FIGS. 1a-j have only two cog connections, but preferably with double the width. In these embodiments the wear of the cog wheels are independent of the placement of the generators.

Figure 16E:
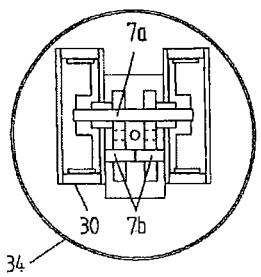
Figure 16F:
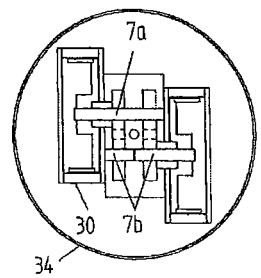

FIGS. 16e-f disclose installations of generators 30 without free hub and flywheel. These energy transformers have a more compact enclosing 34, but deliver a heavily pulsating energy production. In all remaining, the mechanism is affected the same way as in the embodiments according to FIGS. 16c-d.

FIGS. 17a-d disclose examples of an energy transformer as described in FIGS. 7e and 9b, where the conversion modules 2d result in vertically oriented drive shafts.

Figure 17C:
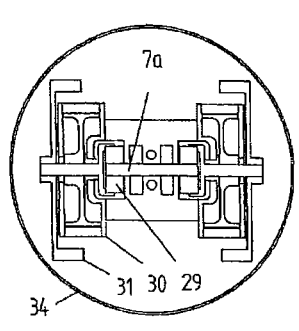

In FIG. 17c two generator units 30, equipped with free hub 29 and flywheel 31, have been arranged in the same way as in FIG. 16c. Since both drive axles of the conversion module are located in the centre of the vertical line of the central unit 1i, the weight and volume distribution are symmetrical. The opposite cog wheels can, with the same advantages as described in FIGS. 16c, be anchored on the separate axels 7b, not disclosed.

Figure 17D:
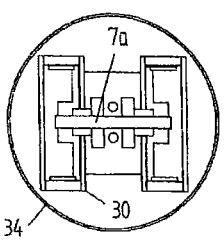

FIG. 17d disclose installations of generators 30 without free hub and flywheel. The embodiment delivers a highly pulsating current but also provide the most light and compact electricity producing converting module illustrated by the enclosing 34. The rotators of the generator, preferably two, are directly connected to the common axel from the conversion modules 2d, which means that the energy transformer receives a symmetrical weight distribution at the same time as the matching between the separate cog wheels and splines are not so critical.

As well rotators as stators can, in smaller units, be surrounded by the reciprocating fluid Fl (compare with canned motors). Thereby all axle seals are eliminated at the same time as the oil receives large cooling areas and can provide all bearings with optimized lubrication. The mass of the rotators (approx 5 kg/10 kW) is negligible in comparison to the decelerating power output it can deliver. This means that all the forces necessary for their acceleration and generated during their deceleration are also negligible. The latch technique 8 can therefore with full effect be used in this embodiment to provide an effective energy output from both directions of the generators.

As an example on the compactness of the transformer it can be mentioned that the volume created according to the embodiment 15*d*, with two integrated generators Alaxion 500STK4m with a collected effect of 66 kW and a collected generator weight of 160 kg, including the volumes in the central unit 1*i* and the conversion module 2*d*, latch technique 8, 9, electronics box E and other not disclosed equipment, is accommodated within a spherically shaped enclosure 34 with a radius of less than 40 cm. This can be compared with the weight of a linear generator which for only 30 kW is expected to weigh approx 1300 kg and take a very large volume. The pulsating power generation require larger areas on the feeding conduit with is a drawback, but this can be compensated by using several power producing units which by using power electronics can be connected to one common feeding line for further electrical distribution.

FIGS. 18*a* and 18*b* disclose examples on an energy transformer where one of the two restriction devices in a bellow 4. This leads to a hermetically enclosed energy transformer with a shorter length, i.e. more compact, than energy transformers with two opposite cylinders. Thus, this embodiment is suitable to attach to a wave tilter. The two opposite pistons 4*a*, 3*b* are rigidly connected with two opposite through-going and supported piston shafts 6*b*. The piston 3*a* is designed to provide hydraulic end position damping in both stroke directions.

Two lobrotating pumps 56, for high flows and low pressure gradients, for example of the type Vogelsang VX136Q218, are in this embodiment used as conversion devices. They have been placed and modified so that they have through-going axles 57. This in order to be able to add cog wheels 58 and free hubs 59 to their internal mechanic and to be able to load the pumps with higher pressure gradients and thereby receive a higher efficiency. Due to these modifications their common effects can be delivered on one common central axis 60 which rotates in the same direction independent of the direction of the flow through the lobrotating pumps. This provides both geometrically and weight distribution wise, a desirable symmetry to the entire energy transformer, whose total density can be close to the displaced water volume. Further, the generators receive a uniform running by the cooperation of the flywheels.

The force operating the lobrotating pumps is created by the surrounding water pressure Px and the pressure the back springing force F5 provides and also by the pressure (underpressure) prevailing in the compliance chamber C1. The force F5 is when a bellow is used is proportionally low. The total pressure gradient over the piston 3*b* is increased with one bar each tenth meter the transformer is lowered into a lake or an ocean. The force F is balanced by the force Fx created by for example a floating buoy on a water surface. All changes of this balance generate reciprocating fluid movements between the pistons, which in turn can be translated into torque for energy delivery by the lobrotating pumps.

The material of the elastomeric bellow, for example a rubber mix, is adapted for an environmental friendly oil Fl in order to optimize the life of the internal mechanics. Since the bellow is lowered into water it is not exposed from degradable ozone and sun light, whereby the life of the bellow is expected to be the same as the other components of the energy transformer.

The primary cylinder C3 can be provided with both a one way valve 11 and an entrance 61 leading to a valve function (not disclosed) which can reduce the underpressure P4 if cavitation problems should occur. The cylinder closing including the valve 11 can also be replace by a cylinder closing according to FIG. 6*a*, which means that the service volume V2 also becomes a compliance volume. The energy transformer have been provided with shut-off valves (latch valves) and level regulating hydraulic cylinder in order to optimize the energy absorption and use the limited stroke of the energy transformer in an optimized way.

FIG. 18*c* disclose an example on how the central unit 1 m can be constructed by several plates 62, which mounted creates a sandwich construction which is able to create flow channels 63, enclose the conversion modules and its linking mechanics, provide support for the through-going axles and other through-goings and provide support for external additional attachments such as for example restriction devices, service volumes, generators, control systems, electronics and hermetically sealed enclosing 34. Volumes in the sandwich construction which is not connected to flows to and from the conversion modules can be provided with seals around the through-going axles and be connected to the pressure in the service volumes so that the sandwich construction is not exposed to too much unnecessary pressure.

The construction can be dimensioned for long life with a continuous operation without maintenance. This is made possible by over sizing of bearings and operating the system with environmental friendly oils which is protected against oxidation by using inert gas in the gas phases of the system. The system can also be provided with an internal (not disclosed) oil purification system.

Below follows brief descriptions of energy transforming units adapted to translate reciprocating fluid movements into rotating axle movements over mechanical conversion modules as disclosed in FIGS. 19-22. In these embodiments the reciprocating fluid itself do not contribute to the torque conversion process but contributes by the shut-off valves to optimized energy absorption, hydraulic end position damping and give the mechanics optimized opportunities for a long life.

FIG. 19*a* discloses an example of an energy transformer where one of the two restriction devices is an elastomeric cylinder 5, which leads to a hermetically enclosed energy transformer. The two opposite pistons are mechanically connected to each other by one or several gear racks 64, preferably arranged in pair with their back facing each other to increase the energy density of the transformer and to increase the opportunity of creating symmetrical, interacting solutions and central one-way directed power absorption.

Gear racks can, like in this example when they are separated from each other, be connected to the pistons with joint mechanics (FIG. 19*b*) transmitted by for example joint heads 65, balanced joists 66 and rubber bearings 67, in order to accomplish a uniform power distribution on the gear racks and to prevent unnecessary loadings on bearings and guiding of the gear racks which may occur when they pass through the central unit 1*n*.

An exact guiding of the gear racks is necessary to accomplish a long life. Of this reason and other the energy transformer have been provided with an inner support cylinder 3 where the piston 68 by the shaft 69 is firmly attached to the piston like end part 4*a* of the elastomeric cylinder.

In this embodiment, with mechanical torque conversion, the internal reciprocating fluid Fl transmits the external pressure Px around the elastomeric cylinder and the pressure created by the back-springing force F5 of the elongated elastomeric cylinder to the piston 3a of the primary cylinder through the flow channels 70 with shut-off valves 8.

The fluid, which is an environmental friendly oil, is contributing in the end position damping which is created when cone shaped pipes 71 on the upper side of the piston 68 gradually is preventing the oil from exiting the volume created between the piston and the end closure 72. A flow of oil is created partly by the decrease in volume between the upper side of the piston 68 and the end closure 72 of the cylinder and partly by the additional flow that have to pass through the piston 68 to accommodate the larger diameter of the elastomeric cylinder and its differences in thickness during its movements. The volume changes created by the movements of the elastomeric cylinder and the differences in thickness is due to interaction of the volumes created by the mechanical coupling of the elastomeric cylinder to a suitable piston area on the opposite piston 3a. The elastomeric cylinder or even bellow like cylinders can interact with the surroundings so a volume balancing occurs between the upper and lower cylinders.

The fluid Fl as liquid has three key functions. It serves as hydraulic media in the end damping functions, it prevents oscillating motions together with the shut-off-valves 8 and it also has very important lubricating and cooling functions for rack, pinions, gears ball- and linear bearings. The entrance of the racks into the conversion module is adapted to the profiles of the gear racks so that a labyrinth seal is created. This prevents pressures from being transmitted into the conversion modules when the shut-off valves 8 are closed.

The piston 3a is designed to provide hydraulic end position damping, as described above.

With a mechanical torque conversion there are no risks of cavitation and the mechanical efficiency is very high. The gear racks have been placed and modified so that their generated effect, with the assistance of cog wheels and free hubs, can be delivered on one common central axis which rotates in the same direction independent of the direction of movement of the gear racks through the central unit 1n. This provides both geometrically and weight distribution wise, a desirable symmetry to the entire energy transformer, whose total density can be close to the displaced water volume. Further, the generators receive a uniform running by the cooperation of the flywheels.

In another embodiment FIG. 19c the backs of the in-pair arranged gear racks have been merged together. The torque conversion from the merged gear rack is transformed by four drive pinions Pi mounted in the center of four axles. On each side of the drive pinions a gear Sg is mounted. The forces of all gears are transmitted to two central gears Cg, one on each side of the gear racks. These central gears are powering two, symmetrically placed axles running two separate generators with free wheels. This embodiment will double the life time and the energy density of the energy transformer.

The fluid pressure in the conversion modules with mechanical transmissions Cm can when internal compliance volumes and service volumes are used as in FIG. 9, be set to a pressure e.g. the pressure in the service volume. This will create a pressure relief in the conversion modules that reduces the separation forces within the central unit. This makes it lighter, cheaper and easier to construct.

When no service volume is used as in FIG. 8 the pressures in and around the conversion modules and generator volume can be set to be close to e.g. the upper compliance volume C2 to reduce separation forces within the central unit In embodiments with external compliance volumes as in FIGS. 4-7 the pressures in and around the conversion modules and generator volume can be set to be close to the surrounding pressure of the energy transformer to reduce separation forces within the central unit.

The force F driving the gear racks is created by the surrounding water pressure Px and the pressure the back springing force F5 provides and also by the pressure (underpressure) prevailing in the compliance chamber C1. The total pressure gradient over the piston 3a is increased with one bar each tenth meter the transformer is lowered into a lake or an ocean.

The back-springing force F5 is determined by for example the rubber mix in or the thickness of the elastomeric cylinder. With an elongation comparative to 100% of the length of the cylinder in rest, the cylinder is expected to have a very long life when it is lowered in water and not exposed to degradable ozone or sun light. The elastomeric cylinder can also be made with coil shaped outer contours which can lead to less stress in the material.

The elastomeric cylinder may also be provided with conduits 24 for current supply and communication which can be joined in the end closures of the elastomeric cylinders (FIG. 19b) and for example with a conduit 51 which can transmit current and communication to a point absorber at the water surface. Also this and other embodiments can be provided with leveling cylinders 42, 43. The construction can be dimensioned for long life with a continuous operation without maintenance which among other things is made possible by a over dimensioning of the gear rack bearings and the distribution of the added force into several pinion drives, and that the drives and the bearings are running in an oil bath which can have an internal (not disclosed) oil purification system.

In another embodiment (not disclosed) with rigid cylinders, internal compliance volumes, service volumes and mechanically connected pistons as in FIG. 9b a hermetically sealed energy converter is made by covering the trough going piston shaft 6a with a straight or spiral shaped elastomeric cylinder with an hermitically closed top as is described for FIG. 10. If needed the flow port 25d in FIG. 10 can be provided with external tubes connected to the service volume. With this embodiment the conversion module Cm can be pressure released and there is double security against oil leakages.

FIGS. 20a-d disclose examples of an energy converter where one of the two restriction devices is an elastomeric cylinder which means that the energy transformer is hermetically enclosed. This embodiment basically functions the same way as the embodiments of FIG. 19. The difference is that the gear racks have been replaced by one or several chains 73, in simple to triple embodiment, preferably pairwise arranged, to increase the energy density of the transformer and to increase the possibility of creating a symmetric and cooperative solution.

In the disclosed embodiment four chain groups in triple embodiments have been attached to the pistons 68 and 3a. The piston 68 is with the shaft 69 firmly attached to the piston like end closure 4a of the elastomeric cylinder with arrangements for end position damping as described in FIG. 19.

The piston 68 is also through two U-beams 74 firmly attached to the piston 3a. The U-beams are placed back to back at a distance from each other. This makes it possible to link the by the chains transmitted torque from primarily four rotating axles into one common central axis which rotates in the same direction independent of the direction of movement of the chains.

The chains (FIG. 20b) are attached to the pistons by for example joint heads 65 and balanced joists 66. This flexible attachment of the chains to the pistons and the coarse adjustment tension bolt 75 simplifies the assembly and at the same time automatically distribute the incoming forces to holders for two pairs of the triple chains 73a at a uniform way.

At the inside between the legs of the U-beams a polymer ledge 76 is mounted which is provided with cut-outs adapted to the surface contour of the chains. The contour ledge has on opposite side cut-outs for permanent magnets 77. These magnets will be able to hold the chains in place independent of their orientation in relation to the gravity. Further, they are also able to attract magnetic debris. The exit and entering of the chain through the central unit 10 is provided with seals similar to labyrinth seals which prevents leakage when the valves 8 is shutting off the power transmitting function of the fluid F1 between the pistons 3a and 4b.

Chains are prolonged during wear and therefore the energy transformer have been provided with chain tensioners 78 (FIG. 20c) which are located between the primary force absorbing chain wheels 79. This means that they simultaneously with the spring tensioning are able to stretch the chains until they have received their finial length, i.e. a prolongation of 3% of the total length of the chains. The construction can be dimensioned for long life with a continuous operation without maintenance by for example choosing a design where the chains are only bent under force once per movement cycle and this bending is performed in an oil bath.

FIG. 20e discloses an example on an energy transformer using timing belts as an energy transforming system. In this embodiment the oscillating fluid is gas and latch valves cannot be used. The system has two pistons that have a rigid mechanical connection 6b between them. In this example this connection divides the timing belt into two belts, one on each side of the connection. There are four central wheels Cw mounted on two shafts that are transforming power to two generators through free-wheels. One central wheel on each side is a supporting Wheel to secure that the timing belt has an optimal contact to the wheel being powered. Which one of the two interacting wheels that works as a supporting wheel depends on the direction of the timing belt movements.

The two double sided timing belts are both powering one shaft at a time. These are running through a slot in the mechanical connection 6b and are situated eccentric, below but symmetric to each other. These shafts are by two freewheels powering two generators with flywheels 30.

The timing belts are running over wheels that are situated in the two pistons that by one or more rods are mechanically firmly attached to each other. The wheels in the piston have a spring-like connection to the piston to keep the timing belt to be pre-stretched when they are not powered by pulling forces to be converted. Once there are pulling forces to be transformed these forces will make the spring-like connection in the pulling piston to become stiff. This shift in pre-stretching forces is done to prolong the life time of the belt.

In order to speed up the rotations and store more energy in the fly-wheel without a gearbox the ends of the timing belts are attached to wheels Sw that after stretching the timing belts can be firmly locked to the central unit. In this way the formatted loop of the timing belt will result in that the belt receives double the speed of the piston motions. A higher rpm increases the storage capacity, enables the use of more compact generators and gives a more even output of electric power.

FIG. 21a-c discloses examples on an energy transformer where one of the two restriction devices is an elastomeric cylinder which means that the energy transformer is hermetically enclosed. This embodiment basically functions the same way as the embodiments of FIGS. 19 and 20. The difference is that the gear racks and chains have been replaced by one or several up- and unwinding bands.

In this example the bands are 0.1 mm thick steel bands 80. They rotate as two upper and two lower band arrangements 81, alternating between rolling on and off two upper 82a and two lower drums 82b, respectively. The drums are located in the central unit 1p. The band arrangements and the drums are so located that they, according to the embodiments in FIGS. 18-20 through gear wheels and rotating hubs can transmit all the generated power primarily developing on four axles into one centrally rotating axel which, independent if up- or unwinding is in progress, rotate in the same direction.

Instead of using a single and thicker steel band, a band arrangement comprised of two thin steel bands, for example 0.1 mm thick, is used. This increases the strength of the total band arrangement and avoids the stiffness a single 0.2 mm would have. Since these bands together are up-winded on top of each other, the outer band will run a slightly longer distance which must be adjusted. This adjustment occurs due to the flexible and sliding attachments arrangements of the bands to the pistons 68, 3a, which in similarity with the pistons in the embodiment of FIG. 20 is firmly attached to each other by two U-beams 74 which are running through the central unit 1p.

Each band arrangement has two attachment points 83 (FIG. 21b) which are joined to each other by for example journalled struts 84, spherical bearings 65 or balanced beam constructions 66. This means that each band receive a possibility to perform self adjusting parallel movements in relation to each other and that they also transmit a self adjusting force to bands winded on the drum shaped wheels 82a, 82b.

The two upper and lower band arrangements are mirrored in the center line of the energy transformer and are joined to each other by a journalled connection 86a to a spring suspended force transmitting plate 85, whose task is to stretch the bands when they without load are up-winded on the drums. During load, i.e. when the bands, using pulling forces, transmits the force striving to unwind the bands from the drums, the force transmitting plate 85 will abut on a slightly flexible rubber plate 86. The through-going U-beams also imply that the opposite band arrangements are only affected by the spring forces of the force transmitting plate which thereby can absorb the difference in length due to the difference in the total drum diameter when the bands are up- and un-winded respectively.

When two thin bands are used in each band arrangement the drums can be made smaller in diameter and still generate the same power, which leads to an energy transformer with high energy density and which can operate at a primarily higher revolution. The difference in the total length between the up- and un-winded double band arrangements is approximately one centimeter, which easily can be absorbed by the force transmitting plate. The difference between the two up- and un-winded single bands is just a few millimeters.

The entrance and exits of the band arrangements through the central unit 1p are elongated slots which do not let any larger flow through when the shut-off valves 8 stops the flow through the flow channels 63.

The construction can be dimensioned for long life with a continuous operation without maintenance by for example choosing a design where the steel bands are only bent under force once per movement cycle. An internal, not disclosed, oil purification system including for example separation of magnetic debris can also be installed if required. If latch valves are not used the fluid can consist of gas.

According to the above described procedure there are also possibilities to up- and un-wind the bands on a common drum, for example by using an upper centrally wider band and two lower, in the periphery located, bands with a width divided in half to operate a common axle.

There are also possibilities, as disclosed in FIG. 21*c*, to double the movements of the bands. Instead of attaching the bands to the pistons they can, after they have passed an impeller or guide wheel attached to the pistons, be attached to the central unit by a force transmitting arrangement. Thinner bands, for example laminate of graphene are preferred. Thicker bands require larger springing characteristics from the force transmitting arrangements and larger diameters of the up- and un-winding wheels In order to further prolong the lifetime of the band the edges of the band can be calendared to be thinner and harder. This will reduce the risk of cracking starting at the edges which otherwise usually is the case.

The latter embodiments, which also are relevant for force transmission with chains and lines, can be suitable for simple systems with a smaller energy absorption, with or without shut-off valves, with mechanical, fluid and/or air hydraulic end dampers. The systems may also have less demand on life and maintenance freedom.

FIGS. 22*a* and 22*b* disclose examples on an energy transformer where one of the two restriction devices is an elastomeric cylinder which means that the energy transformer is hermetically enclosed. This embodiment basically functions the same way as the embodiments of FIG. 21. The difference is that the bands have been replaced by steel wires or synthetic ropes 87 with small diameters and thin laminas. The relation between wire diameter and drum diameter shall preferably be over a factor 40. Small wire diameters means that the upper and lower drums 88*a*, 88*b* in the central unit 1*q* receives a smaller diameter and thereby a primary higher rotational speed. Further, the drums can be provided with adapted coil shaped cut-outs for the up- and un-winding of the wires.

The mechanically flexible attachment of the wires to the pistons 68 and 3*a* in FIG. 22*b* differs from the attachment of the band in FIG. 21*b* in that the attachment device have to be adapted to the side transferring which occur when the wires are rolled on and off the drums 88*a*, b. This is done by letting the beam 66 rest on a ball joint 89 which in turn rests on an axial roller bearing 90 which in turn rests on a bolt 91 attached in the spring suspended force transmitting plate 85. The attachment device 92 of the wires is a slightly flexible steel axis in order to reduce possible side forces at the attachment point of the wire. During force transmittance the force transmitting plate is affected in the same way as has been explained for the embodiment according to FIG. 21 and can thus absorb the prolongation of the wires which may occur during time.

Between the two upper and lower drum arrangements in the central unit 1*q* there is a sealing wall which prevents leakage when the shut-off valve 8 is closing. Like in the embodiments above, the wires are not exposed to the forces created during hydraulic or mechanic end damping and neither to the forces needed for the double acting functions of the energy transformer. The wires in the present example are only loaded with one bending movement per operational cycle.

Embodiments similar to the ones shown in FIG. 21*a* can also be provided with wires which are a part of a mechanical torque conversion.

FIGS. 23*a-e* disclose preferred basic embodiments of the invention.

Figures 23A, 23B, 23C, 23D:
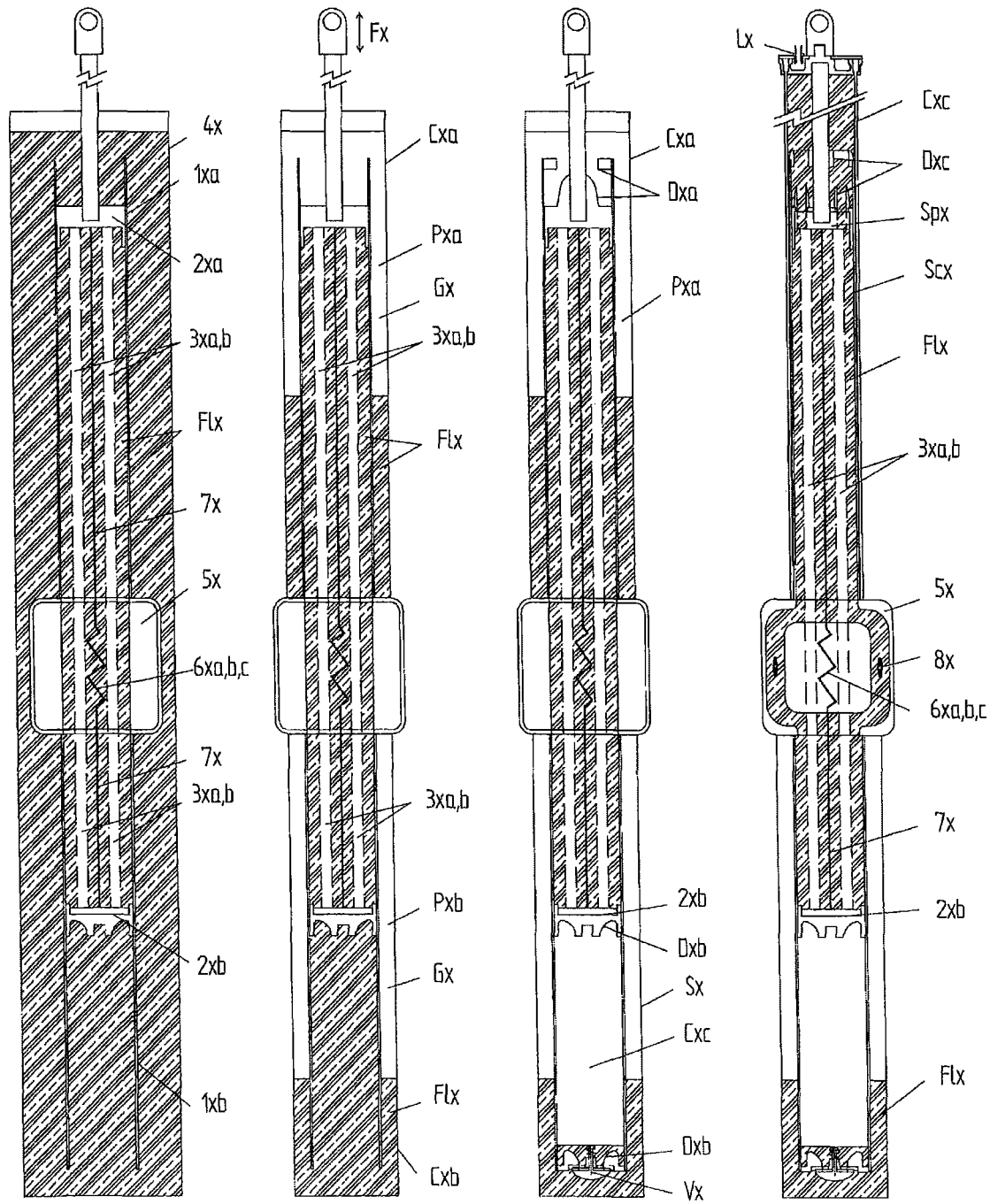

FIG. 23*a* discloses how two, one primary and one secondary, restriction devices 1*xa*, 1*xb* with pistons 2*xa*, 2*xb* are mechanically joined by shafts and/or profiles 3*xa* or by gear racks and profiles 3*xb* which may contain permanent magnets 3*xb* so that their related movements together with the enclosing 4*x* create an internal or external closed cycle of operation for the fluid Flx in an enclosed reciprocating volume which entirely or partly passes through a central unit 5*x*.

The central unit 5*x* contains energy conversion modules 6*xa, b, c;* where 6*xa* is hydraulic energy conversion modules, 6*xb* are mechanical energy conversion modules and 6*xc* are coils which directly are converting the reciprocating movements of the permanent magnets into electric power. The energy transformers are hydraulic if using fluid Fl, mechanical 7*x* if using gear rack, chains, timing belts, bands, steel bands, wires, ropes or coils when oscillating profiles 3*xa*, 3*xb* containing permanent magnets are attached to the pistons 2*xa*, 2*xb*. The mechanical connection 3*xa, b* of the pistons result in that the incoming external forces F are transmitted through the central unit 5*x* so that they always can be adapted to suitable forces over the energy transforming units, i.e. pressure gradients during hydraulic force transmittance or pulling and pushing forces during mechanical force transmittance. The fluid Flx can be a liquid or a gas.

The energy transforming units 6*xa, b, c* can as hydraulic units 6*xa* be for example gear pumps and lobe rotating pumps 2*a-d*, 56 and as mechanical units 6*xb* be converters operated by gear racks, chains, timing belts, flat belts, steel bands, wires and synthetic ropes 64, 73, 80, 81, 87, Cm or by coils 6*xc* for direct conversion of the reciprocating movements into electric power.

FIG. 23*b* discloses one embodiment where the external or internal closed circle of operation, created by the enclosing 4*x* and the fluid Flx in FIG. 23*a*, has been replaced by at least one, or as disclosed in this figure, two compliance chambers Cxa and Cxb for storage of energy. The shafts and/or profiles 3*xa, b* between the pistons 2*xa*, 2*xb* transmit the incoming force so that energy can be stored in the compliance chambers Cxa, Cxb without exposing the energy conversion modules 7*x*, 6*xa*, 6*xb*, 6*xc* to the forces needed for this energy storage. If the fluid Flx is a liquid the compliance chambers will also contain the gas Gx.

By using this procedure, incoming one-way acting forces F can be stored in the energy transformer as both overpressures Pxa and under-pressures Pxb without effecting the energy conversion modules during the storage period but is used as energy source together with the energy in the flywheel during the time needed for the return motion of the energy transformer. This will give an even production of electric current and reduce the areas of the electric wires for transportation of electric power.

The cylinder 1*xa* and the piston 2*xa*, which do not have to be sealing, create barriers for unnecessary contact between the fluid and the gas phase Pxa, provide an excellent guidance for the piston shaft and provide a possibility to create a simple hydraulic end position damping.

If both the pistons of the two mechanically connected restriction devices are sealed towards their respective compliance volumes the fluid in between them can be set to a suitable pressure for example to the pressure in the service volume. When the oscillating flow is transforming the energy to the conversion modules (FIGS. 1-18) this interconnection can be equipped with a one way valve that does not allow flow from the conversion modules but does allow flow into them in order to prevent cavitations around the conversion modules. When reciprocating mechanical units (FIGS. 19-23) are transforming energy to the conversion modules the interconnection will create a pressure relief around the conversion modules that reduces the separation forces within the central unit that makes it lighter, cheaper and easier to construct.

FIG. 23c disclose one embodiment where the compliance chamber Cxb in FIG. 23b have been developed into a service volume Sx and where a high vacuum chamber Cxc with direct action on the sealing piston 2xb create the compliance chamber for the movements of the reciprocating fluid. A one-way valve Vx is supervising that a leakage of fluid over the piston 2xb can be pressed out through the valve by for example an overpressure Pxa in the compliance chamber Cxa and that an end position damping Dxb can be constructed. Through the mechanical connection between the pistons an interaction is created where the end position damping can principally be arranged at four end positions which are created when the two pistons are moving from or towards the central unit. A second hydraulic end position damping is in this figure denominated Dxa.

FIG. 23d discloses an embodiment where the compliance chamber Cxa has been replaced by a stretchable compliance chamber Cxc which also create the upper restriction device. The stretchable compliance chamber is constructed by for example a bellow or a straight or coil shaped elastomeric cylinder with or without an inner support cylinder Scx with a support piston Spx.

The support piston Spx can create a hydraulic end position damping Dxc without exposing the central unit 5a and the energy conversion modules 6x and their couplings 7x or 3xb to the pistons Spx, 2xb for non desirable forces.

The central unit 5x can also be provided with shut-off valves 8x which can convert the incoming sinus shaped movements into powerful square shaped movements in order to optimize power absorption and energy transformation to the available stroke of the transformation unit.

The stretchable compliance chamber Cxc entail that the whole energy transformer is hermetically sealed and that the surroundings are operating as an outer compliance chamber. Further, the straight or spiral shaped elastomeric cylinder can be provided with coil winded conducting threads or wires for current feed and communication Lx to for example a point absorber on a water surface.

Preferred embodiments of an energy transforming unit have been described. It will be appreciated that these can be modified within the scope of the appended claims without departing from the inventive idea. Thus, unless contradictory, the features of the different embodiments can be used in all embodiments, such that for example the embodiments with generators or linear generators may exhibit the features of the other embodiments.

What is claimed:

1. An energy transforming unit adapted to convert external forces (F) into rotating axle movements on at least one force transmitting axle or directly into electric power, wherein the energy transforming unit comprises:
    a conversion module adapted to convert the external forces into rotating axle movements or into electric power,
    at least one restriction device which is arranged to forward the external forces (F) into reciprocating movement over the conversion module,
    a central unit which at least partly encloses the conversion module, and
    a fluid (FL) enclosed within an enclosed volume which is sealed off from the surroundings of the energy transforming unit, wherein
        the restriction device is arranged to forward the external force (F) into a reciprocating movement of the fluid,
        the external forces (F) are forwarded into reciprocating movements over the conversion module by means of the reciprocating movement of the fluid and/or a reciprocating movement of a mechanical arrangement, and wherein,
        the energy transforming unit further comprises at least one yielding compliance chamber, containing a compressible medium, wherein the at least one restriction device is in connection with the at least one yielding compliance chamber by means of the fluid (FL) to enable the reciprocating movement and absorption of energy.

2. The energy transforming unit according to claim 1, comprising two restriction devices and one or several mechanical force transmitting devices which connect the two restriction devices, lock the two restriction devices in relation to each other and transmit the external force (F) between these two restriction devices.

3. The energy transforming unit according to claim 2, wherein at least one of the compliance chambers is provided with an internal pressure arrangement to manually and/or automatically control the pressure in the compliance chamber/chambers to optimize energy extraction and avoid cavitations.

4. The energy transforming unit according to claim 1, wherein the at least one compliance chamber is connected to the surroundings by a one way valve.

5. The energy transforming unit according claim 1, comprising a braking arrangement which is a mechanical or hydraulic brake adapted to slow down the transmitted fluid movements in the end position(s) of the at least one restriction device.

6. The energy transforming unit according to claim 5, wherein the braking arrangement comprises valves, cylinder top and piston shapes which create a hydraulic end stop/end position damping for the restriction device.

7. The energy transforming unit according to claim 1, wherein the fluid (FL) comprises a non-compressible fluid or a gas.

8. The energy transforming unit according to claim 1, wherein the at least one compliance chamber is delimited from its surroundings.

9. The energy transforming unit according to claim 1, wherein the at least one restriction device is connected to at least one force transmitting device so that the incoming forces (F) is stored in the at least one compliance chamber, parallel to a transformation of the forces (F) into mechanical power in the central unit.

10. The energy transforming unit according to claim 1, wherein one restriction device is mechanically connected to the incoming forces (F), and adapted to generate two transmitting movements which create an internal closed cycle across the conversion module through movement of a fluid (Fl).

11. The energy transforming unit according to claim 1, wherein the central unit comprises inputting and outputting flow channels which lead to and from the conversion module in which fluid (Fl) is arranged to be guided, and one or several latch valves provided in the inputting and/or outputting flow channels and adapted to transform a free reciprocating fluid flow into a closed flow which prevents the reciprocating movement.

12. The energy transforming unit according claim 1, comprising a service volume which is delimited from the surroundings and which is connectable to the at least one restriction device and/or the conversion module and/or any other part of the energy transforming unit.

13. The energy transforming unit according to claim 11, comprising one or several hydraulic cylinders located in the service volume and adapted to position the energy transforming unit in a certain position to optimize force absorption and to use the stroke of the energy transforming unit in an optimized way.

14. The energy transforming unit according to claim 12, wherein the energy transforming unit, together with integrated equipment, is entirely or partly enclosed by a closed volume that also can act as or be a part of the service volume.

15. The energy transforming unit according to claim 1, wherein the at least one restriction device comprises at least one of the following:
a double acting restriction device having the shape of a straight cylinder with a piston or a cylinder with a revolving piston element, or one way acting restriction devices, such as an enclosed bellows, back springing straight or spiral shaped elastomeric cylinders.

16. The energy transforming unit according to claim 1, wherein the at least one restriction device has the shape of a cylinder and a primary piston on which the external forces (F) act via a force transmitting device creating a reciprocating movement of the piston in the cylinder in order to transmit energy to the conversion module.

17. The energy transforming unit according to claim 1, wherein the conversion module comprises a mechanical arrangement of at least one of the following: gear rack, chain, timing belt, cord, steel band, wire, or rope.

18. The energy transforming unit according to claim 1, wherein the energy conversion module is a linear generator, converting external forces (F) into electrical power.

19. The energy converter according to claim 1, wherein at least one conversion module is provide with a freewheel and/or a flywheel connected to a force transmitting axle.

20. The energy transforming unit according to claim 1, wherein the energy transforming unit is hermetically closed to the surroundings.

21. An energy transforming unit according to claim 1, wherein the energy transforming unit further comprises a hydraulic braking arrangement which is adapted to protect the central unit and its conversion modules from damaging pressure peaks.

22. The energy transforming unit according to claim 1, wherein a straight and spiral shaped elastomeric cylinders is provided with conducting threads or wires for current feed and communication.

23. The energy transforming unit according to claim 1, wherein at least one of the compliance chambers is provided with an over- or under-pressure to increase energy absorption of an energy absorber, which is connected to the energy transforming unit or in which the energy transforming unit is integrated.

24. An energy transforming system, comprising an energy transforming unit according to claim 1 integrated in or connected to an energy absorber in the form of a point absorber with an opposite force created by a reactive mass or a weight at the bottom of a sea or an ocean.

25. A method of providing hydraulic return force in an energy transforming unit or an energy transforming system converting reciprocating wave movements into rotating axle movements on at least one force transmitting axle or directly into electric power, comprising the steps of:
storing incoming reciprocating external forces (F) as potential energy during at least a part of a reciprocating motion by moving at least one primary piston in a first direction opposite to return a gas spring force exerted by a gas spring formed by at least one first compliance chamber and at least one second compliance chamber located on opposite sides of a restriction device, the gas spring return force being adapted to counteract the external forces (F);
simultaneously transforming part of the incoming external forces (F) into mechanical rotating axle movements of at least one force transmitting axle or electrical power using a conversion module located in a central unit, wherein the storing and transforming of energy are parallel events releasing the stored energy by allowing the primary piston to move in the same direction as a return force exerted by the gas spring, the gas spring return force being adapted to co-act with the external forces (F) at a time when return movement of the reciprocating system is desired.

26. The method according to claim 25, wherein a timing of locking and unlocking the reciprocating motion of the reciprocating system in a first and a second direction is controlled by fully or partially opening and closing latch vales located in fluid flow channels in order to optimize energy absorption of an externally arranged energy absorber by controlling its phase of motion with respect to incoming ocean waves.

\* \* \* \* \*

UNITED STATES PATENT AND TRADEMARK OFFICE
CERTIFICATE OF CORRECTION

| | |
|---|---|
| PATENT NO. | : 9,879,648 B2 |
| APPLICATION NO. | : 15/237100 |
| DATED | : January 30, 2018 |
| INVENTOR(S) | : Stig Lundback |

Page 1 of 1

It is certified that error appears in the above-identified patent and that said Letters Patent is hereby corrected as shown below:

In the Specification

Column 17, Line 10: Please correct "FIGS. 1 a-d" to read -- FIGS. 2 a-d --

Column 26, Line 12: Please correct "F1" to read -- Fl --

Signed and Sealed this
Sixth Day of November, 2018

Andrei Iancu
*Director of the United States Patent and Trademark Office*